US012757182B2

(12) United States Patent
Abedini et al.

(10) Patent No.: US 12,757,182 B2
(45) Date of Patent: Oct. 6, 2026

(54) TECHNIQUES FOR RETROREFLECTION BEAMFORMING

(71) Applicant: QUALCOMM Incorporated, San Diego, CA (US)

(72) Inventors: Navid Abedini, Basking Ridge, NJ (US); Keerthi Priya Dasala, Bridgewater Township, NJ (US); Jianghong Luo, Skillman, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 18/339,716

(22) Filed: Jun. 22, 2023

(65) Prior Publication Data

US 2024/0430874 A1 Dec. 26, 2024

(51) Int. Cl.

| | |
|---|---|
| ***H04W 72/25*** | (2023.01) |
| ***H04W 72/044*** | (2023.01) |
| ***H04W 72/51*** | (2023.01) |
| *H04W 88/04* | (2009.01) |

(52) U.S. Cl.

CPC ......... *H04W 72/046* (2013.01); *H04W 72/25* (2023.01); *H04W 72/51* (2023.01); *H04W 88/04* (2013.01)

(58) Field of Classification Search

None

See application file for complete search history.

(56) References Cited

U.S. PATENT DOCUMENTS

| | | | | |
|---|---|---|---|---|
| 12,408,022 | B2 * | 9/2025 | Wang | H04B 7/22 |
| 2024/0089725 | A1 * | 3/2024 | Wang | G01S 7/006 |
| 2024/0163840 | A1 * | 5/2024 | Säily | H04L 25/0222 |
| 2025/0202564 | A1 * | 6/2025 | Dasala | H04L 5/0051 |

* cited by examiner

*Primary Examiner* — Kodzovi Acolatse

(74) *Attorney, Agent, or Firm* — Holland & Hart LLP

(57) ABSTRACT

Methods, systems, and devices for wireless communications are described. A user equipment may perform retroreflection on a waveform received from a wireless device (e.g., such as a network entity or a second UE) to assist or perform various operations, such as identifying positioning information of the UE, broadcast signaling, or sidelink relay discovery. For example, the UE may receive control signaling indicating a set of resources during which the UE activates retroreflection communications between the UE and the second wireless device. The UE may monitor the set of resources for a waveform from the second wireless device and transmit a retroreflected signal to the second wireless device based on the received waveform. In this way, the second wireless device may identify a position of the UE based on the retroreflected signal, discover the presence of the UE for broadcast or sidelink relay discovery based on the retroreflected signal, or both.

23 Claims, 18 Drawing Sheets

TECHNIQUES FOR RETROREFLECTION BEAMFORMING

FIELD OF TECHNOLOGY

The following relates to wireless communications, including techniques for retroreflection beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a UE and a network entity may perform beamforming and beam management procedures to create and identify a beam to use for communications. Such beam management procedures may consume significant amounts of power at the UE.

SUMMARY

The described techniques relate to improved methods, systems, devices, and apparatuses that support techniques for retroreflection beamforming. For example, the described techniques provide for a UE to reduce power consumption associated with beam management procedures by using retroreflection.

The UE may perform retroreflection (e.g., backscattering) on a waveform received from another wireless device (e.g., such as a network entity or a second UE) to assist or perform various operations, such as identifying positioning information of the UE, broadcast signaling, or sidelink relay discovery. In some examples, the UE may receive control signaling that indicates a set of resources during which the UE activates the retroreflection communications between the UE and the other wireless device. The UE may monitor the set of resources for a waveform from the other wireless device and transmit a retroreflected signal to the other wireless device based on the received waveform. In this way, the other wireless device may identify a position of the UE based on the retroreflected signal, discover the presence of the UE for broadcast or sidelink relay discovery using the retroreflected signal, or both.

A method for wireless communications at a first wireless device is described. The method may include receiving control signaling that indicates a set of resources during which the first wireless device activates retroreflection communications between the first wireless device and a second wireless device, monitoring a first subset of the set of resources for a waveform in accordance with the control signaling, and transmitting, via a second subset of the set of resources, a retroreflected signal of the waveform based on monitoring for the waveform.

A first wireless device for wireless communications is described. The first wireless device may include one or more memories storing processor-executable code and one or more processors coupled with the one or more memories and individually or collectively operable to execute the code to cause the first wireless device to receive control signaling that indicates a set of resources during which the first wireless device activates retroreflection communications between the first wireless device and a second wireless device, monitor a first subset of the set of resources for a waveform in accordance with the control signaling, and transmit, via a second subset of the set of resources, a retroreflected signal of the waveform based on monitoring for the waveform.

The first wireless device may include means for receiving control signaling that indicates a set of resources during which the first wireless device activates retroreflection communications between the first wireless device and a second wireless device, means for monitoring a first subset of the set of resources for a waveform in accordance with the control signaling, and means for transmitting, via a second subset of the set of resources, a retroreflected signal of the waveform based on monitoring for the waveform.

A non-transitory computer-readable medium storing code for wireless communications is described. The code may include instructions executable by a processor to receive control signaling that indicates a set of resources during which the first wireless device activates retroreflection communications between the first wireless device and a second wireless device, monitor a first subset of the set of resources for a waveform in accordance with the control signaling, and transmit, via a second subset of the set of resources, a retroreflected signal of the waveform based on monitoring for the waveform.

Some examples of the method, first wireless devices, and non-transitory computer-readable medium described herein may further include operations, features, means, or instructions for modulating the waveform with information based on monitoring the first subset of the set of resources, where the retroreflected signal of the waveform includes the information based on modulating the waveform with the information.

In some examples of the method, first wireless devices, and non-transitory computer-readable medium described herein, the information includes an identifier (ID) of the first wireless device, waveform information, service capabilities of the first wireless device, or both.

Some examples of the method, first wireless devices, and non-transitory computer-readable medium described herein may further include operations, features, means, or instructions for receiving, from the second wireless device, a broadcast control signal based on transmitting the retroreflected signal of the waveform.

Some examples of the method, first wireless devices, and non-transitory computer-readable medium described herein may further include operations, features, means, or instructions for receiving, via a set of sidelink resources, a sidelink control message indicating that the first wireless device may be to be a relay in sidelink communications between the first wireless device and the second wireless device, where receiving the sidelink control message may be based on transmitting the retroreflected signal of the waveform.

Some examples of the method, first wireless devices, and non-transitory computer-readable medium described herein may further include operations, features, means, or instructions for transmitting a capability message indicating a capability of the first wireless device to support the retroreflection communications, where receiving the control signaling may be based on the capability of the first wireless device.

In some examples of the method, first wireless devices, and non-transitory computer-readable medium described herein, the capability message further indicates supported modulation schemes for the retroreflection communications, supported frequency bands for the retroreflection communications, latency metrics associated with the retroreflection communications, a transmission gain associated with the retroreflection communications, or a combination thereof.

In some examples of the method, first wireless devices, and non-transitory computer-readable medium described herein, the capability message further indicates whether the first wireless device supports active retroreflection communications between, a power capability associated with the active retroreflection communications, or both.

In some examples of the method, first wireless devices, and non-transitory computer-readable medium described herein, the capability message further indicates whether the first wireless device supports concurrent retroreflection communications and actively powered communications between the first wireless device and the second wireless device or a third wireless device.

Some examples of the method, first wireless devices, and non-transitory computer-readable medium described herein may further include operations, features, means, or instructions for receiving, via the control signaling, an indication of an antenna array to use for the retroreflection communications, where the retroreflected signal of the waveform may be transmitted via the antenna array.

In some examples of the method, first wireless devices, and non-transitory computer-readable medium described herein, activation of the retroreflection communications may be based on a cell associated with the second wireless device, a channel raster associated with a channel between the first wireless device and the second wireless device, or both.

In some examples of the method, first wireless devices, and non-transitory computer-readable medium described herein, the first subset of the set of resources may be associated with a first frequency band and the second subset of the set of resources may be associated with a second frequency band different from the first frequency band.

In some examples of the method, first wireless devices, and non-transitory computer-readable medium described herein, the first subset of the set of resources and the second subset of the set of resources may be associated with a same frequency band.

In some examples of the method, first wireless devices, and non-transitory computer-readable medium described herein, the first wireless device may be operating in a connected mode of operation, and the control signaling may be received via a radio resource control message (RRC), a medium access control-control element (MAC-CE), downlink control information (DCI), or a combination thereof.

In some examples of the method, first wireless devices, and non-transitory computer-readable medium described herein, the first wireless device may be operating in one or both of an idle mode of operation or an inactive mode of operation, and the control signaling may be received via a system information (SI) transmission.

A method for wireless communications is described. The method may include transmitting control signaling that indicates a set of resources during which a first wireless device activates retroreflection communications between the first wireless device and a second wireless device, transmit, via a first subset of the set of resources, a waveform in accordance with the control signaling, and receiving, via a second subset of the set of resources, a retroreflected signal of the waveform based on transmitting the waveform.

An apparatus for wireless communications is described. The apparatus may include one or more memories storing processor-executable code and one or more processors coupled with the one or more memories and individually or collectively operable to execute the code to cause the apparatus to transmit control signaling that indicates a set of resources during which a first wireless device activates retroreflection communications between the first wireless device and a second wireless device, transmit, via a first subset of the set of resources, a waveform in accordance with the control signaling, and receive, via a second subset of the set of resources, a retroreflected signal of the waveform based on transmitting the waveform.

Another apparatus for wireless communications is described. The apparatus may include means for transmitting control signaling that indicates a set of resources during which a first wireless device activates retroreflection communications between the first wireless device and a second wireless device, means for transmit, via a first subset of the set of resources, a waveform in accordance with the control signaling, and means for receiving, via a second subset of the set of resources, a retroreflected signal of the waveform based on transmitting the waveform.

A non-transitory computer-readable medium storing code for wireless communications is described. The code may include instructions executable by a processor to transmit control signaling that indicates a set of resources during which a first wireless device activates retroreflection communications between the first wireless device and a second wireless device, transmit, via a first subset of the set of resources, a waveform in accordance with the control signaling, and receive, via a second subset of the set of resources, a retroreflected signal of the waveform based on transmitting the waveform.

Some examples of the method, apparatuses, and non-transitory computer-readable medium described herein may further include operations, features, means, or instructions for measuring positioning information associated with the first wireless device based on receiving the retroreflected signal of the waveform and transmitting the positioning information associated with the first wireless device to a third wireless device based on measuring the positioning information.

Some examples of the method, apparatuses, and non-transitory computer-readable medium described herein may further include operations, features, means, or instructions for transmitting a broadcast control signal in a direction of the first wireless device, the direction being based on the positioning information.

Some examples of the method, apparatuses, and non-transitory computer-readable medium described herein may further include operations, features, means, or instructions for transmitting, via a set of sidelink resources, a sidelink control message indicating that the first wireless device may be to be a relay in sidelink communications, where transmitting the sidelink control message may be based on receiving the retroreflected signal of the waveform and the positioning information.

In some examples of the method, apparatuses, and non-transitory computer-readable medium described herein, the positioning information includes an angle between the first wireless device and the second wireless device, a delay associated with communications between the first wireless device and the second wireless device, doppler information associated with the communications between the first wireless device and the second wireless device, or a combination thereof.

Some examples of the method, apparatuses, and non-transitory computer-readable medium described herein may further include operations, features, means, or instructions for receiving, from a third wireless device, a message indicating the set of resources for the retroreflection communications, the message further indicating a set of transmission parameters for transmission of the waveform from the second wireless device to the first wireless device, where transmitting the control signaling may be in accordance with receiving the set of resources, and where transmitting the waveform may be in accordance with the set of transmission parameters.

In some examples of the method, apparatuses, and non-transitory computer-readable medium described herein, the set of transmission parameters include a waveform configuration, a transmission power of the waveform, an ID associated with the first wireless device, or a combination thereof.

Some examples of the method, apparatuses, and non-transitory computer-readable medium described herein may further include operations, features, means, or instructions for receiving a capability message indicating a capability of the first wireless device to support the retroreflection communications, where transmitting the control signaling may be based on the capability of the first wireless device.

Some examples of the method, apparatuses, and non-transitory computer-readable medium described herein may further include operations, features, means, or instructions for transmitting, via the control signaling, an indication of an antenna array to use for the retroreflection communications.

In some examples of the method, apparatuses, and non-transitory computer-readable medium described herein, the retroreflected signal of the waveform includes information from the first wireless device, the information including an ID of the first wireless device, waveform information, service capabilities of the first wireless device, or a combination thereof.

A method is described. The method may include identifying a first wireless device and a second wireless device that support retroreflection communications and transmitting, to the second wireless device and based on identifying of the second wireless device, a message indicating a set of resources for the retroreflection communications with the first wireless device.

An apparatus is described. The apparatus may include one or more memories storing processor-executable code and one or more processors coupled with the one or more memories and individually or collectively operable to execute the code to cause the apparatus to identify a first wireless device and a second wireless device that support retroreflection communications and transmit, to the second wireless device and based on identifying of the second wireless device, a message indicating a set of resources for the retroreflection communications with the first wireless device.

Another apparatus is described. The apparatus may include means for identifying a first wireless device and a second wireless device that support retroreflection communications and means for transmitting, to the second wireless device and based on identifying of the second wireless device, a message indicating a set of resources for the retroreflection communications with the first wireless device.

A non-transitory computer-readable medium storing code is described. The code may include instructions executable by a processor to identify a first wireless device and a second wireless device that support retroreflection communications and transmit, to the second wireless device and based on identifying of the second wireless device, a message indicating a set of resources for the retroreflection communications with the first wireless device.

Some examples of the method, apparatuses, and non-transitory computer-readable medium described herein may further include operations, features, means, or instructions for transmitting, via the message, an indication of a set of transmission parameters for transmission of a waveform from the second wireless device to the first wireless device.

In some examples of the method, apparatuses, and non-transitory computer-readable medium described herein, the set of transmission parameters include a waveform configuration, a transmission power of the waveform, an ID associated with the first wireless device, or a combination thereof.

Some examples of the method, apparatuses, and non-transitory computer-readable medium described herein may further include operations, features, means, or instructions for receiving, from the second wireless device, an indication of positioning information associated with the first wireless device, where the positioning information includes an angle between the first wireless device and the second wireless device, a delay associated with communications between the first wireless device and the second wireless device, doppler information associated with the communications between the first wireless device and the second wireless device, or a combination thereof.

Some examples of the method, apparatuses, and non-transitory computer-readable medium described herein may further include operations, features, means, or instructions for transmitting, to the second wireless device, a message indicating of a set of sidelink resources for sidelink communications between the first wireless device and the second wireless device based on receiving the positioning information.

DETAILED DESCRIPTION

In some wireless communications systems, a UE may perform beamforming in order to generate (e.g., form) a beam to use for communications. In such cases, the UE may be equipped with multiple antennas, where each antenna element may include, or otherwise be connected to a power amplifier, a low noise amplifier, a phase shifter or the like. Using such components, the UE may adjust the phase and gain (e.g., power) of the antennas to form and steer (e.g., direct) the beam. Further, the UE may perform beam management and training procedures to identify beams to use for communications. However, beamforming and beam management procedures may lead to extensive power consumption at the UE, and such power consumption may further increase with larger quantities of UE antennas. As such, techniques may be desired for reducing the power consumption at the UE due to performance of beamforming and beam management procedures.

The techniques, methods, and devices described herein may enable the UE to use retroreflection for communications with another wireless device (e.g., a network entity, a sidelink UE, or both) in order to assist in various operations (e.g., such as beam management, positioning procedures, sidelink procedures, or the like), leading to a reduction in power at the UE. As described herein, retroreflection may refer to the UE reflecting, or otherwise transmitting, an incident signal back at the angle of arrival of the incident signal (e.g., such that the signal is reflected back in the same direction).

For example, the UE may receive control signaling (e.g., such as radio resource control (RRC) signaling, medium access control (MAC) signaling, downlink control information (DCI), or the like) indicating a set of resources during which the UE is to activate retroreflection for communications between the UE and the other wireless device. As such, the UE may activate the retroreflection and monitor the set of resources for a waveform from the other wireless device. Based on the monitoring, the UE may transmit the retroreflected signal back to the other wireless device. In some examples, the UE may modulate the waveform with information, such as an identifier (ID) of the UE. In this way, the other wireless device and the UE may communicate without performing extensive beam management, thereby saving power at the UE.

Aspects of the disclosure are initially described in the context of wireless communications systems. The aspects of the disclosure are further described in the context of antenna arrays and process flows. Aspects of the disclosure are further illustrated by and described with reference to apparatus diagrams, system diagrams, and flowcharts that relate to techniques for retroreflection beamforming.

Figure 1:
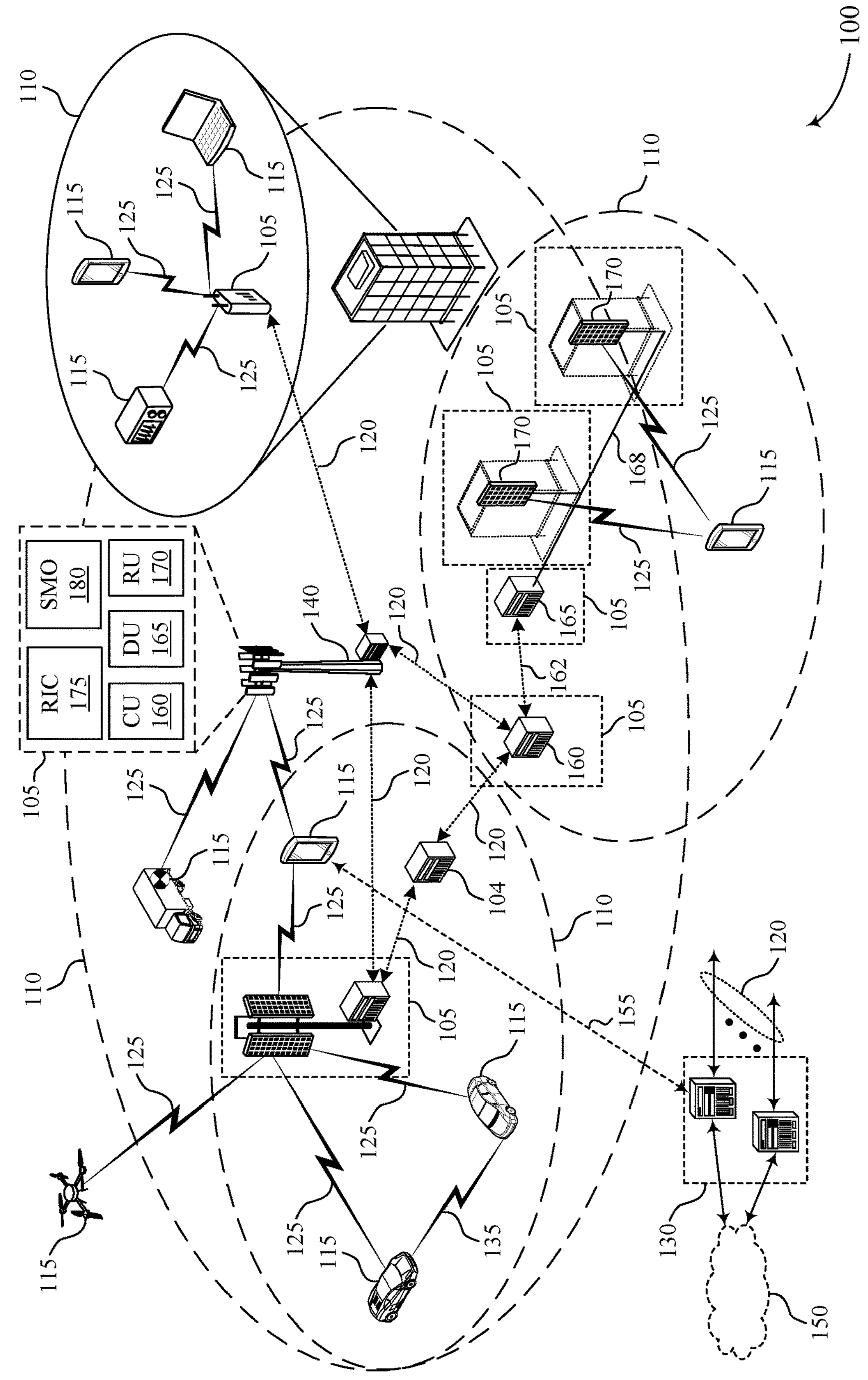
FIG. 1 shows an example of a wireless communications system that supports techniques for retroreflection beamforming in accordance with one or more aspects of the present disclosure.

FIG. 1 shows an example of a wireless communications system 100 that supports techniques for retroreflection beamforming in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, a NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for retroreflection beamforming as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the UE 115 may perform beamforming in order to generate (e.g., form) a beam (e.g., uplink and downlink beams) to use for communications. In such cases, the UE 115 may be equipped with multiple antennas, where each antenna element may include, or otherwise be associated with a power amplifier, a low noise amplifier, a phase shifter or the like. In this way, the UE 115 may adjust the phase and gain (e.g., power) of the antennas in order to form and steer (e.g., direct) the beam. Further, the UE 115 may perform beam management and training procedures to identify (e.g., optimal) beams to use for communications. However, beamforming and beam management procedures may lead to extensive power consumption at the UE 115, where such power consumption may be further increased as the quantity of antennas at the UE 115 increases. As such, techniques may be desired in order to reduce the power consumption at the UE 115 due to performance of beamforming and beam management procedures.

The techniques, methods, and devices described herein may enable the UE 115 to use retroreflection of one or more signals from another wireless device (e.g., a network entity or a sidelink UE 115) to assist in various operations (e.g., beam management, positioning procedures, sidelink procedures, or the like), leading to a reduction in power at the UE 115. For example, the UE 115 may receive control signaling (e.g., radio resource control (RRC) signaling, medium access control (MAC) signaling, downlink control information (DCI), or the like) indicating a set of resources during which the UE 115 is to activate retroreflection for communications between the UE 115 and the other wireless device. As such, the UE 115 may activate the retroreflection and monitor the set of resources for a waveform from the wireless device. Based on the monitoring, the UE 115 may transmit the retroreflected signal back to the wireless device, thereby enabling the wireless device and UE 115 to communicate without performing extensive beam management.

Figure 2:
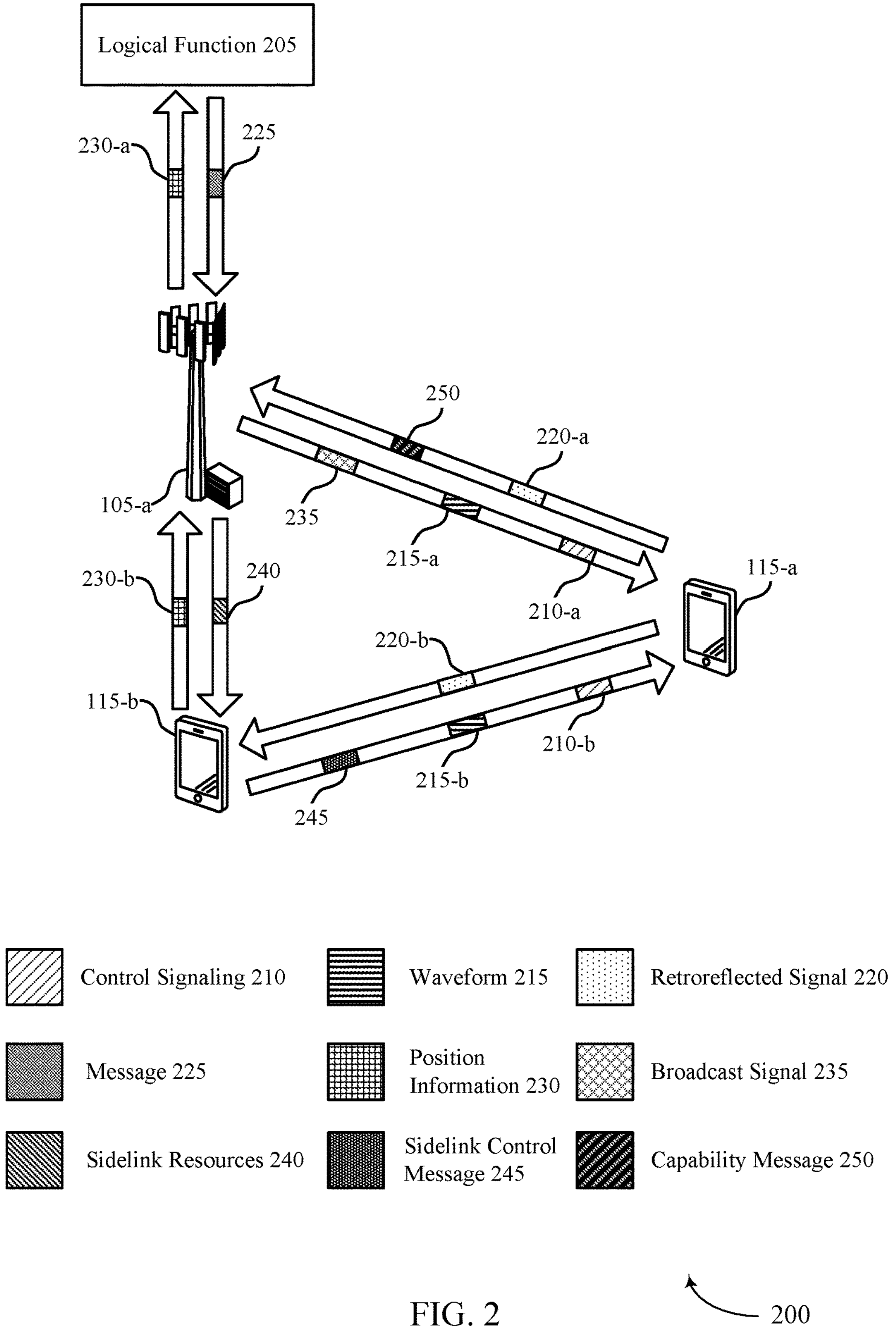
FIG. 2 shows an example of a wireless communications system that supports techniques for retroreflection beamforming in accordance with one or more aspects of the present disclosure.

FIG. 2 shows an example of a wireless communications systems 200 that supports techniques for retroreflection beamforming in accordance with one or more aspects of the present disclosure. Aspects of the wireless communications systems 200 may implement, or be implemented by, aspects of the wireless communications systems 100 as described herein with reference to FIG. 1. For example, the wireless communications system 200 may include a UE 115-*a* (e.g., a first wireless device) and a UE 115-*b* (e.g., a second wireless device or a sidelink UE), which may be examples of a UE 115 as described herein.

Further, the wireless communications system 200 may include a network entity 105-*a* (e.g., a second wireless device or a third wireless device), which may be an example of network entities 105 as described herein. The network entity 105 may implement or be in communication with a logical function 205 (e.g., via a third wireless device). The logical function may be implemented, for example, by a DU 165, a CU 160, or a location management function (LMF). The techniques described in the context of the wireless communications system 200 may enable the UE 115-*a* to perform retroreflection communications.

In some cases, the UE 115-*a* may be equipped with multiple antennas and use beamforming (e.g., generation of a beam) for communication between the UE 115-*a* and the network entity 105-*a*, for communication between the UE 115-*a* and the UE 115-*b*, or both. The UE 115-*a* may perform beamforming to create and refine beams for communications at the UE 115-*a*, where such beamforming may be used for communications via upper frequency bands.

For example, the UE 115-*a* may be equipped with one or multiple phased arrays, where each phased array may include multiple antenna elements. For each antenna element (or group of antenna elements), the UE 115-*a* may be equipped with respective power amplifiers, low noise amplifiers, phase shifters, or a combination of such components, where the combination of components may be referred to as an active beamforming network. In such cases, as part of beamforming, the UE 115-*a* may adjust inputs and weights of the components in order to refine, and steer, beams for communications. That is, by adjusting the phase, gain, or both of each antenna, the UE 115-*a* may create transmission beams, reception beams, or both in different directions.

Upon generating the various transmission and reception beams, the UE 115-*a* may perform beam management and training procedures in order to identify a beam for communications (e.g., an optimal beamforming configuration). That is, the UE 115-*a* may perform various beam management procedures (e.g., using machine learning techniques) to identify a beam for transmission and reception of messages in the wireless communications system 200. As described herein, the UE 115-*a* may use the beamforming and beam management and training procedures to perform actively powered communications. Such actively power communications may refer to actions, taken by the UE 115-*a*, to generate, steer, identify, and power transmission or reception beams for communications in the network (e.g., without the use of retroreflection).

However, such beamforming procedures and beam management procedures may increase power consumption at the UE 115-*a*. Further, the UE 115-*a* may experience increased power consumption by using the radio frequency (RF) components, such as the phase arrays, local oscillators (LO), and synthesizers (e.g., otherwise referred to as radio frequency front end components). Thus, techniques may be desired to reduce power consumption caused by beamforming and beam management procedures at the UE 115-*a*.

In accordance with the techniques described herein, the UE 115-*a* may use retroreflection for communications between the UE 115-*a* and wireless devices (e.g., the network entity 105-*a*, the UE 115-*b*, or both) in order to reduce performance of beamforming and beam management, thereby reducing power consumption of the UE 115-*a*. As described herein, retroreflection may refer to a wireless device reflecting, or otherwise transmitting, an incident signal back at the angle of arrival of the incident signal (e.g., the signal is reflected back in the same direction). Additionally, as described herein, retroreflection may otherwise be referred to, or be an example of, backscattering used by passive and semi-passive IoT devices (e.g., radio frequency identification (RFID) Tags).

To perform such retroreflection, the UE 115-*a* may be equipped with various antenna arrays that are configured to reflect a signal towards the angle of arrival of the signal. The UE 115-*a* may implement techniques for such retroreflection beamforming, for example, by implementing a Van-Atta antenna array or a Rotman Lens. The Van-Atta antenna array and the Rotman Lens may be further described herein with reference to FIGS. 3A and 3B. By using retroreflection communications, the UE 115-*a* may refrain from performing the relatively extensive power-hungry beamforming and beam management procedures that may be used during actively power communications.

For example, by reflecting back the signal in the same direction as the arrival direction, the UE 115-*a* may not use prior information of the incident direction, which may simplify the beam management and beamforming procedures at the UE 115-*a* and reduce power consumption, save resources, and reduce signaling overhead. In such examples, the UE 115-*a* may continue to implement power amplifiers, low noise amplifiers, or both in order to assist powering the transmission of the reflected signals, which may be referred to as active retroreflection communications. In some other examples, the UE 115-*a* may implement a passive retroreflection architecture, such that the UE 115-*a* excludes the use of power amplifiers, low noise amplifiers, or both during retroreflection communications. In such examples, the UE 115-*a* may rely on energy received from the incident signal to reflect the incident signal, where, in such examples, the UE 115-*a* may experience zero power consumption. Such passive retroreflection may be referred to as backscattering.

In some examples, the UE 115-*a* may support both retroreflection communications in addition to actively powered communications. That is, the UE 115-*a* may have a capability (e.g., feature) to support retroreflection communication in addition to legacy beamforming capabilities. As such, the retroreflection communications (e.g., retroreflection beamforming) may be enabled, via control signaling 210, for different operations (e.g., use cases), for different transmission occasions (e.g., time resources), or both, in order to support low-complexity and low-power operations. That is, a wireless device (e.g., a transmitter of the waveform 215, such as the network entity 105-*a* or UE 115-*b*) may transmit control signaling 210 (e.g., RRC messaging, DCI, MAC-CE, or sidelink control information (SCI)), indicating resources (e.g., time and frequency resources) during which the UE 115-*a* is to activate retroreflection communications.

Based on activating the retroreflection communications at the UE 115-*a*, the wireless device may transmit a waveform 215 (e.g., a continuous waveform), via the indicated resources, towards the UE 115-*a*. In response, the UE 115-*a* may transmit (e.g., backscatter) a retroreflected signal 220 of the waveform 215 back towards the wireless device.

In some examples, based on the operation (e.g., use case) for the retroreflection communications, the UE 115-*a* may modulate the retroreflected signal 220 to include (e.g., carry) information, such as an ID of the UE 115-*a*. The UE 115-*a* may modulate the retroreflected signal 220 using modulation techniques such as amplitude shift keying (ASK), on-off keying (OOK), frequency shift keying (FSK), or phase shift keying (PSK). Additionally, or alternatively, the wireless device (e.g., transmitter of the waveform 215) may operate in a full-duplex mode, such that the wireless device may simultaneously transmit the waveform 215 and receive the retroreflected signal 220.

In some examples, the UE 115-*a* may receive the waveform 215 via a first subset of resources and transmit the retroreflected signal 220 via a second subset of frequency resources, where the first and second subset of frequency resources are different. That is, the UE 115-*a* may receive the waveform 215 via a first frequency resource (e.g., frequency band) and transmit the retroreflected signal 220 of the waveform 215 via a second frequency resource (e.g., a second frequency band) that is different from the first frequency band. Alternatively, the UE 115-*a* may receive the waveform 215 via a first subset of resources and transmit the retroreflected signal 220 via the subset of frequency resources. That is, the UE 115-*a* may receive the waveform 215 via a first frequency resource (e.g., frequency band) and transmit the retroreflected signal 220 of the waveform 215 via the first frequency resource.

Further, in some examples, the retroreflection communications (e.g., transmission of the waveform 215 and reflection of the retroreflected signal 220) may be performed in the same or different frequency bands as actively powered communications. That is, the UE 115-*a* may simultaneously communicate with a first wireless device (e.g., the network entity 105-*a*) via actively power communications in a first frequency band and also perform the retroreflection communications in the first frequency band with the first wireless device or a second wireless device (e.g., the UE 115-*b* or other network entity 105). Alternatively, such operations may be performed in different bands, such that the UE 115-*a* may communicate with the first wireless device via actively power communications in a first frequency band, while also performing the retroreflection communications with the first wireless device or second wireless device in a second frequency band different from the first frequency band.

Additionally, the antenna elements used for retroreflection may be at least partially the same or different than antennas used for actively powered communications. As an illustrative example, the UE 115-*a* may include 10 antenna arrays and use a first subset of the 10 antenna arrays for retroreflection communications and use a second subset of the 10 antenna arrays for actively power communications, where the first and second subsets are distinct from one another. In this way, the UE 115-*a* may use distinct antenna arrays for each communication operation. Alternatively, as another illustrative example, the UE 115-*a* may use each of the 10 antenna arrays for actively powered communications and use a subset of the 10 antenna arrays for retroreflection communications. In this way, the UE 115-*a* may use overlapping antenna arrays for both communication operations.

To support the use of retroreflection communications, the UE 115-*a* may transmit a capability message 250 indicating various capabilities of the UE 115-*a* to support retroreflection communications. In such examples, the wireless device (e.g., UE 115-*b* or network entity 105-*a*) may allocate resources, select, and indicate antenna arrays, indicate power parameters, or the like based on the capability message 250. For example, the UE 115-*a* may transmit, via the capability message 250, supported modulation schemes for the retroreflection communications, such as whether the UE 115-*a* supports OOK, ASK, PSK, or FSK modulation schemes. The UE 115-*a* may indicate, via the capability message 250, information associated with the retroreflection architecture at the UE 115-*a*, such as gain information of the retroreflected signal 220, whether the UE 115-*a* supports active retroreflection, passive retroreflection, or both.

In some examples, the UE 115-*a* may transmit, via the capability message 250, supported frequency bands for the retroreflection communications. Further, the UE 115-*a* may indicate, via the capability message 250 whether the UE 115-*a* supports simultaneous retroreflection communications and actively powered communications. If the UE 115-*a* does support such simultaneous operations, the UE 115-*a* may indicate the associated band combinations (e.g., frequency bands) for which the UE 115-*a* supports simultaneous retroreflection communications and actively powered communications.

Further, the UE 115-*a* may indicate, via the capability message 250, latency metrics associated with activating retroreflection communications, such as a latency metric for activating and deactivating the retroreflection communications (e.g., a latency associated with turning ON or OFF the retroreflection), a latency metric for switching between the retroreflection communications and the actively powered communications, or both.

In some examples, the UE 115-*a* may indicate, via the capability message 250, whether device supports active retroreflection communications (e.g., the use of power amplifiers and low noise amplifiers for reflecting the signal back to the wireless device). If the UE 115-*a* does support active retroreflection, then the UE 115-*a* may also indicate an associated power capability (e.g., max amplification gain or transmission power of the retroreflected signal). In such examples, the UE 115-*a* may receive, via control signaling 210 and based on indicating the UE 115-*a* supports active retroreflection communications, an associated transmission power control command from the wireless device (e.g., the network entity 105-*a*). That is, the network entity 105-*a* may indicate, based on the capability message 250, a power at which the UE 115-*a* is to transmit the retroreflected signal 220-*a*. In this way, the network entity 105-*a* may indicate for the UE 115-*a* to power boos the retroreflected signal 220-*a*.

In some examples, if the UE 115-*a* implements multiple retroreflector arrays, the UE 115-*a* may indicate, via the capability message 250, a quantity of reflector arrays supported at the UE 115-*a*, indices associated with the quantity of reflector arrays, or both. In such examples, the UE 115-*a* may receive, from the wireless device and via the control signaling 210, an indication (e.g., such as an index) of a selected antenna array to use for retroreflection. Such an indication may be an example of logical indexing, quasi-co location (QCL) indexing, or transmission configuration indicator (TCI). In the example of the TCI, the network entity 105-*a* may indicate the selected antenna array to the UE 115-*a* via a TCI state configured via actively powered communications.

As described herein, the UE 115-*a* may use retroreflection for various operations in order to reduce overhead, reduce power consumption, or both. Such operations described herein are not exhaustive examples of all operations where retroreflection communications may be performed. That is, it is to be understood that retroreflection communications may be used for a variety of operations within the wireless communications system 200.

In one example, the network entity 105-*a* may activate retroreflection communications at the UE 115-*a* to identify positioning information 230 of the UE 115-*a*. That is, in some time intervals, the UE 115-*a* may be configured to activate retroreflection and modulate an ID on the retroreflected signal 220 such that the network entity 105-*a* may identify the positioning information 230 associated with the UE 115-*a*.

For example, the logical function 205 (e.g., as implemented at a DU or CU) may identify one or more wireless devices (e.g., TRPs or UEs) that support retroreflection, such as the network entity 105-*a* and the UE 115-*a*. In some examples, the logical function 205 may identify that the UE 115-*a* supports retroreflection communications based on the network entity 105-*a* receiving and reporting the capability of the UE 115-*a* via a capability message 250. In response to identifying the network entity 105-*a* and the UE 115-*a*, the logical function 205 may indicate, via a message 225, for the network entity 105-*a* to transmit a waveform 215-*a* and monitor for a retroreflected signal 220-*a*. The logical function 205 may further indicate, via the message 225, time resources for transmission of the waveform 215-*a*, frequency resources for transmission of the waveform 215-*a*, a spatial beam to use for transmission of the waveform 215-*a*, or a combination thereof. Additionally, the logical function 205 may indicate, via the message 225, waveform information for transmission of the waveform 215-*a* (e.g., such as an amplitude, a phase, or both), a transmission power for the waveform 215-*a*, or both. In some examples, the logical function 205 may indicate, via the message 225, one or more IDs of devices for which the network entity 105-*a* is to measure and report positioning information 230. That is, the logical function 205 may include, in the message 225, the ID of the UE 115-*a*, such that the network entity 105-*a* has an indication that it is to measure and report the positioning information 230 of the UE 115-*a*.

In response to receiving the message 225, the network entity 105-*a* may transmit control signaling 210-*a* indicating a set of resources (e.g., the time resources and frequency resources received via the message 225) during which the UE 115-*a* is to activate retroreflection communications and monitor for the waveform 215-*a*. In some examples, the network entity 105-*a* may transmit, via the control signaling 210-*a*, a request for the UE 115-*a* to include information associated with the UE 115-*a* in the retroreflected signal, such as an ID of the UE 115-*a*.

Based on transmitting the control signaling 210-*a*, the network entity 105-*a* may transmit the waveform 215-*a* via the set of resources. In some examples, the network entity 105-*a* may transmit the waveform 215-*a* via transmission and reception beam sweeping (e.g., transmit the waveform 215-*a* via various directions) in order to cover various directions. The UE 115-*a* may monitor for and receive the waveform 215-*a* and transmit, via the set of resources, the retroreflected signal 220-*a* of the waveform 215-*a*. In such examples, the UE 115-*a* may modulate the waveform 215-*a* with information, such as the ID of the UE 115-*a*, and transmit the retroreflected signal 220-*a* of the waveform 215-*a* based on modulating the waveform 215-*a* with the information.

The network entity 105-*a* may detect the presence of the UE 115-*a* based on receiving the retroreflected signal 220-*a* of the waveform 215-*a* and measure (e.g., acquire, determine, calculate) the positioning information 230 based on receiving the retroreflected signal 220-*a*. Additionally, the network entity 105-*a* may identify the UE 115-*a* based on the information (e.g., ID) received in the retroreflected signal 220-*a*.

For example, the network entity 105-*a* may determine, as part of the positioning information 230, an angle between the UE 115-*a* and the network entity 105-*a*, a communication delay, doppler information (e.g., doppler spread, doppler shift, or both), or a combination thereof based on receiving the retroreflected signal 220-*a*. That is, because the retroreflected signal 220 is a reflection of the waveform 215-*a* and is received at the same angle as the angle of transmission, the network entity 105-*a* may be able to calculate the positioning information 230 between the UE 115-*a* and the network entity 105-*a* based on the relationship between the waveform 215-*a* and the retroreflected signal 220-*a*. Based on measuring the positioning information 230, the network entity 105-*a* may transmit, via a message, the positioning information 230-*a* to the logical function 205 (e.g., LMF), such that the logical function 205 may process the positioning information 230.

In this way, the UE 115-*a* and the network entity 105-*a* may perform retroreflection to identify positioning information 230 of the UE 115-*a*, without performing extensive beam management and beamforming operations, thereby reducing processing power at the UE 115-*a*.

In another example, the network entity 105-*a* may activate retroreflection communications at the UE 115-*a* to assist in reducing overhead of broadcast signals 235. For example, using current techniques, the network entity 105-*a* may blindly transmit a broadcast signal 235 (e.g., a synchronization signal block (SSB), system information (SI), SI update indication, paging indication, or the like) in a first quantity of directions (e.g., all N directions). In such cases, however, the network entity 105-*a* may experience increased power consumption due to transmitting such broadcast signals in each direction.

As such, the network entity 105-*a* may use retroreflection communications in order to identify the directions for which the network entity 105-*a* is to transmit the broadcast signal 235. For example, the network entity 105-*a* may transmit control signaling 210-*a* indicating a set of resources during which the UE 115-*a* is to activate retroreflection communications. In such examples, the set of resources may be referred to as an interrogation phase during which the network entity may transmit the waveform 215-*a* (e.g., otherwise referred to as an interrogation signal) in the first quantity of directions (e.g., all directions). That is, the network entity 105-*a* may beam sweep the waveform 215-*a* in each direction via the set of resources.

During the set of resources (e.g., the interrogation phase), the UE 115-*a* may receive the waveform 215-*a* and transmit the retroreflected signal 220-*a* of the waveform 215-*a* to the network entity 105-*a*. In some examples, the UE 115-*a* may modulate information on the waveform 215-*a* to include in the retroreflected signal 220-*a*. For example, the UE 115-*a* may indicate, via the retroreflected signal 220-*a*, the ID of the UE 115-*a*. Additionally, or alternatively, the UE 115-*a* may indicate, via the retroreflected signal 220-*a*, service requests of the UE 115-*a*, which may be an indication of a request from the UE 115-*a*, such as a request to receive a SSB via the broadcast signal 235, a request to receive SI via the broadcast signal 235, an indication of which SI the UE 115-*a* is requesting, or a combination thereof.

The network entity 105-*a* may receive the retroreflected signal 220-*a* from the direction of the UE 115-*a* and identify the direction where the UE 115-*a* is located. That is, based on transmitting the waveform 215-*a* and receiving the retroreflected signal 220-*a*, the network entity 105-*a* may identify the positioning information 230 (e.g., direction) where the UE 115-*a* is located. In response to identifying the positioning information 230 (e.g., direction) of the UE 115-*a*, the network entity 105-*a* may transmit the broadcast signal 235 in the direction of the UE 115-*a* (e.g., in the M relevant directions) and refrain from transmitting the broadcast signal 235 in the first quantity of directions (e.g., all N directions). In some examples, the network entity 105-*a* may transmit repetitions of the broadcast signal 235 in order to enable the UE 115-*a* to acquire a reception beam.

That is, as described herein, the network entity 105-*a* may transmit the waveform 215-*a* in the first quantity of directions (e.g., N directions) and receive multiple retroreflected signals 220 via UEs 115 located in a subset of the first quantity of directions. As such, based on receiving the multiple retroreflected signals 220 from the various UEs 115, the network entity 105-*a* may identify a second quantity of directions (e.g., M relevant directions) where the UEs 115 are located. In this way, the network entity 105-*a* may transmit the broadcast signal 235 in the second quantity of direction (e.g., the M relevant directions) and refrain from beam sweeping the broadcast signal 235 in the first quantity of direction (e.g., all N directions), thereby reducing power consumption at the network entity 105-*a*.

In some examples, the UE 115-*a* may be operating in a connected mode, an idle mode, or an inactive mode. As such, if the UE 115-*a* is operating in the connected mode (e.g., such as RRC_CONNECTED), the network entity 105-*a* may transmit the control signaling 210-*a* (e.g., the set of resources) to the UE 115-*a* via an RRC message, a MAC-CE, DCI, or a combination thereof. Alternatively, if the UE 115-*a* is operating in either of the idle mode (e.g., RRC_IDLE) or inactive mode (e.g., RRC_INACTIVE), then the UE 115-*a* may be preconfigured with the set of resources (e.g., the interrogation phase or window). Additionally, or alternatively, if the UE 115-*a* is operating in either of the idle mode (e.g., RRC_IDLE) or inactive mode (e.g., RRC_INACTIVE), the set of resources may be pre-allocated (e.g., such as defined by the 3GPP standards) and the UE 115-*a* may monitor the set of resources in response to an indication in the control signaling 210-*a*. In some examples, if the UE 115-*a* is operating in either of the idle mode (e.g., RRC_IDLE) or inactive mode (e.g., RRC_INACTIVE), the UE 115-*a* may receive the control signaling 210-*a* via a cell of a second network entity 105 (e.g., last serving cell), where the control signaling 210-*a* may be an example of SI.

In such examples, the UE 115-*a* may activate retroreflection communications during the interrogation phase based on a cell of the network entity 105-*a*, a channel raster of a channel between the network entity 105-*a* and the UE 115-*a*, or both. That is, the interrogation phase may be supported for some cells or some channel rasters. Additionally, such operations (e.g., transmission of the waveform 215-*a* during the interrogation window)) may be similar to on-demand SSB, where a SSB (e.g., keep-alive signal) and UL trigger (e.g., cell wake-up signal) may be combined and supported via backscattering.

In this way, the network entity 105-*a* may transmit the broadcast signal 235 in the direction of the UE 115-*a* (e.g., the M relevant directions) and refrain from beam sweeping the broadcast signal 235 in the first quantity of direction (e.g., all N directions) based on transmitting the waveform 215-*a* (e.g., interrogation signal) and receiving the retroreflected signal 220, thereby reducing power consumption at the network entity 105-*a*.

In another example, the UE 115-*a* may activate retroreflection communications in order to perform sidelink discovery. That is, the UE 115-*b* may activate retroreflection communications for the UE 115-*a* (e.g., and other sidelink UEs not shown) to perform discovery in sidelink communications, thereby reducing power consumption and overhead of discovering the existence of nearby UEs 115.

In some cases, the UE 115-*b* may use one or more UEs 115, such as the UE 115-*a*, in proximity to the UE 115-*b* for relaying sidelink or uplink information. Using current techniques, the UE 115-*b* may transmit a discovery signal to one or more UEs 115 operating within a cell. The UE 115-*b* may monitor the received power of responses received from each UE 115 to select, or otherwise identify, a relay candidate. However, such operations may increase the power consumption at the UE 115-*b*, the UE 15-*a*, or both, due to the UE 115-*b* being unaware of a quantity of UEs 115 in the cell that may respond to the discovery message.

In accordance with the techniques described herein, the UE 115-*a* and the UE 115-*b* may implement interrogation windows, within which the UE 115-*b* (e.g., relay UEs or UEs searching for nearby UE relays) may broadcast (beam sweep) a waveform 215-*b* (e.g., an interrogation signal or wake-up signal). During such interrogation windows, the UE 115-*a* may active the retroreflection communications in order to reflect the waveform 215-*b* towards the arrival angle of the waveform 215-*b*.

For example, the UE 115-*b* may transmit control signaling 210-*b* (e.g., SCI) to the UE 115-*a* indicating a set of resources (e.g., interrogation window) during which the UE 115-*b* is to activate retroreflection. In some examples, the set of resources may be preconfigured (e.g., as defined in the 3GPP standards) and the UE 115-*b* may transmit the control signaling 210-*b* to indicate to the UE 115-*a* to begin monitoring the set of resources. Alternatively, the UE 115-*b* may receive an indication of the set of resources from the network entity 105-*a* and transmit, via the control signaling 210-*b*, an indication of the set of resources to the UE 115-*a*.

Based on transmitting the control signaling 210-*b*, the UE 115-*b* may transmit the waveform 215-*b* to the UE 115-*a*. The UE 115-*a* may transmit a retroreflected signal 220-*b* of the waveform 215-*b* to the UE 115-*b*. In some examples, the UE 115-*a* may modulate the waveform 215-*b* with information, such that the retroreflected signal 220-*b* carries the information. For example, the UE 115-*b* may include, in the retroreflected signal 220-*b*, the ID of the UE 115-*a*, a cell ID of the serving cell of the UE 115-*a*, types of service the UE 115-*a* supports, capabilities of the UE 115-*a*, or a combination thereof. The UE 115-*b* may receive the retroreflected signal 220-*b* and identify the positioning information 230 of the UE 115-*a*.

Based on identifying the UE 115-*a*, the UE 115-*b* may transmit, using actively powered communications, a sidelink control message 245 to perform a follow-up direct handshake. For example, in response to identifying the UE 115-*a* (e.g., or other UEs 115 in proximity to the UE 115-*b*), the UE 115-*b* may report the detected UEs 115 to the network entity 105-*a*. In such examples, the UE 115-*b* may transmit an indication of the positioning information 230-*b* to the network entity 105-*a*.

The network entity 105-*a* may allocate sidelink resources 240 for actively powered communications between the UE 115-*b* and the detected UEs 115 (e.g., the UE 115-*a*) and indicate the sidelink resources 240 to the UE 115-*b*. The UE 115-*b* may perform the follow-up direct handshake via the sidelink resources 240. For example, the UE 115-*b* may transmit, via the sidelink resources 240, the sidelink control message 245 requesting the UE 115-*a* to be a relay for the UE 115-*b*. In this way, the UE 115-*b* and the UE 115-*b* may use retroreflection for sidelink relay discovery.

In some examples, during such relay discovery procedures, the UE 115-*a* may support simultaneous actively powered communications and retroreflection communications (e.g., when having separate antennas for the two modes). In such examples, the UE 115-*a* may perform the retroreflection communications for the sidelink communications, while performing actively powered communications with the network entity 105-*a* via a Uu link. In such examples, the actively powered communications and the retroreflection communications may be associated with the same frequency band (e.g., performed int the same frequency band) or be associated with different frequency bands (e.g., performed in different frequency bands).

Figure 3A:
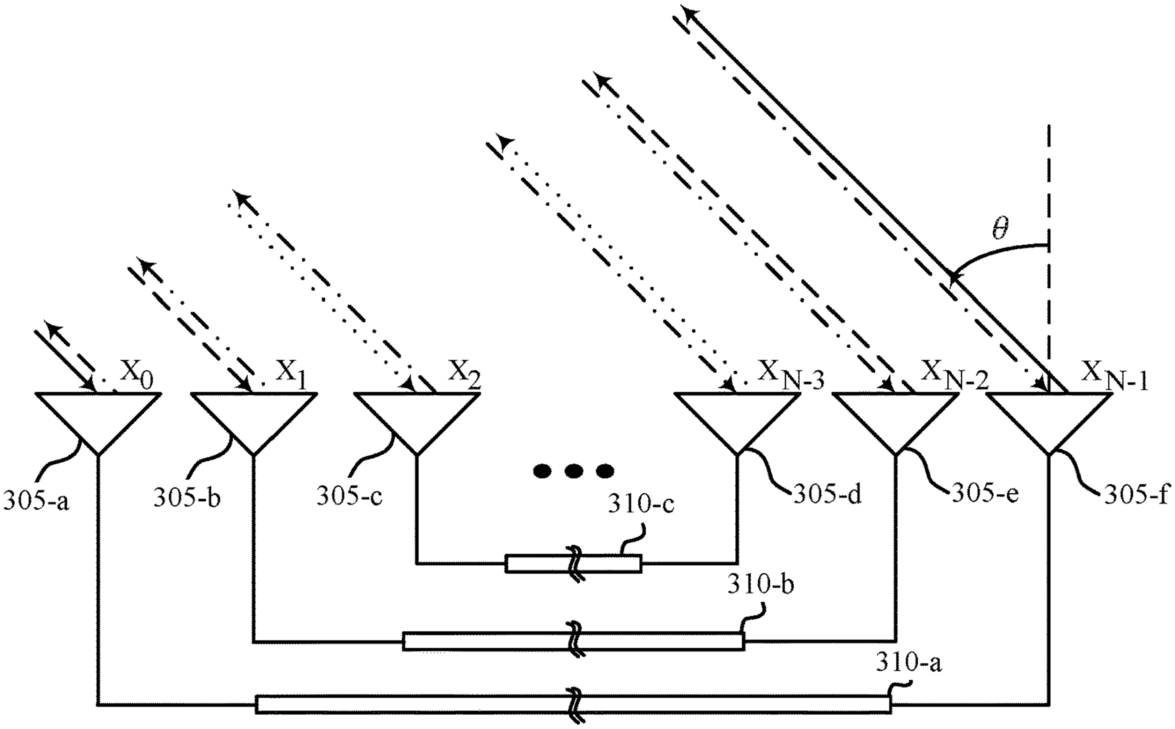
FIGS. 3A and 3B show examples of an antenna array and an antenna that support techniques for retroreflection beamforming in accordance with one or more aspects of the present disclosure.
Figure 3B:
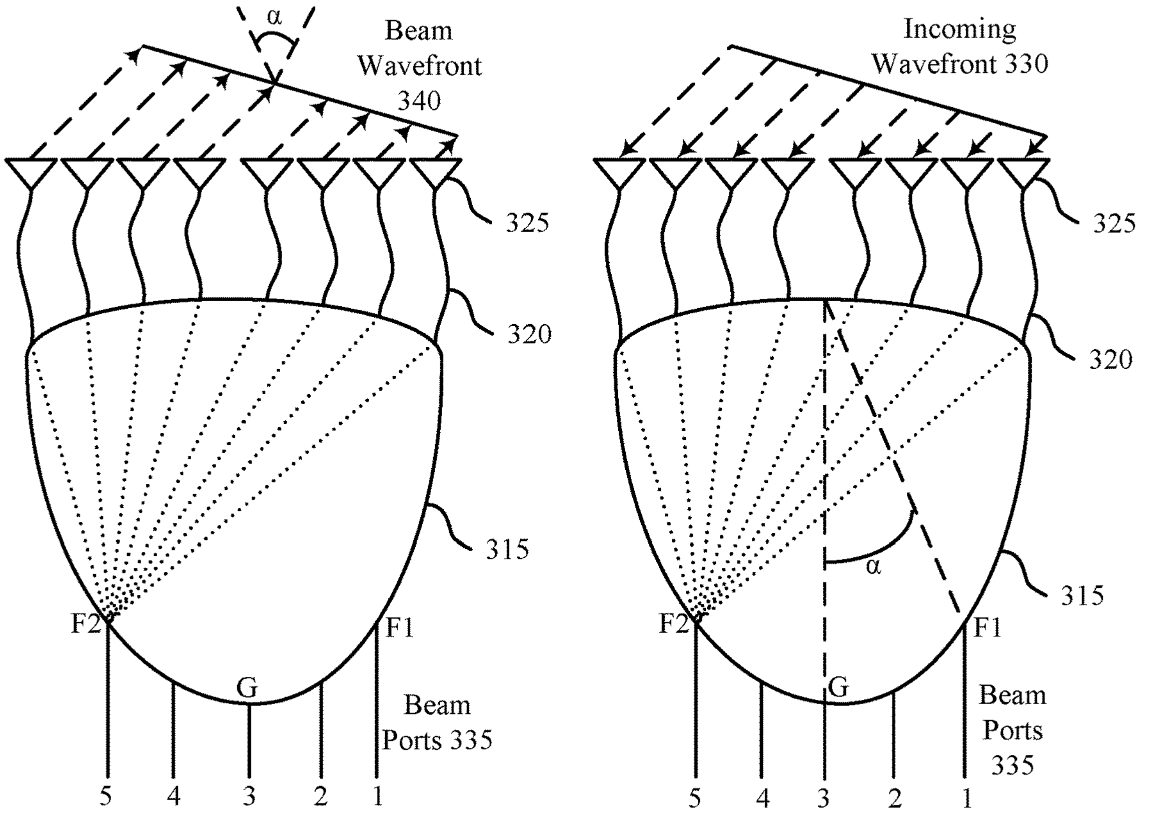

FIG. 3A and FIG. 3B show examples of an antenna array 300 and an antenna 301, respectively, that support techniques for retroreflection beamforming in accordance with one or more aspects of the present disclosure. Aspects of the antenna array 300 and antenna 301 may be implemented by aspects of the wireless communications system 100 and the wireless communications system 200 as described herein. For example, the antenna array 300 and the antenna 301 may be implemented in a UE 115 as described herein. The techniques described in the context of the antenna array 300 and the antenna 301 may enable a UE to perform retroreflection communications for various operations.

FIG. 3A. The antenna array 300 may be an example of a passive beam alignment using a Van Atta architecture. The antenna array 300 may include multiple antenna elements 305, where various antenna elements 305 may be coupled by equal phase transmission lines 310. For example, the antenna array 300 may include an antenna element 305-*a* coupled with an antenna element 305-*f* via an equal phase transmission line 310-*a*. Similarly, an antenna element 305-*b* may be coupled with the antenna element 305-*e* via an equal phase transmission line 310-*b*, while an antenna element 305-*c* may be coupled with the antenna element 305-*d* via the qual phase transmission line 310-*c*.

The antenna array 300 may be configured to reflect a waveform (e.g., such as a waveform 215) at the same angle as the angle of arrival. For example, to reflect the waveform at the same angle as the angle of arrival, the antenna array 300 may be configured to reverse the phase of the waveform, such that the waveform is transmitted back in the same direction. A waveform may be represented by Equation 1:

$$x_n = x_0 * e^{-j\pi n \sin(\theta)} \tag{1}$$

As such, the antenna array 300 may be configured to transmit a retroreflected signal (e.g., such as a retroreflected signal 220) of the waveform, where the retroreflected signal may be represented by Equation 2:

$$y'_n = y'_0 \cdot e^{+j\pi n \sin(\theta)} \tag{2}$$

In such examples, to achieve phase reversal of the waveform, the retroreflected signal may be transmitted by the antenna element 305 that is coupled with the antenna element 305 that received the waveform. For example, the UE 115 may receive the waveform via the antenna element 305-*a* at an angle θ and transmit the retroreflected signal of the waveform at the angle θ via the antenna element 305-*f*. Likewise, if the UE 115 receives the waveform via the antenna element 305-*f* at an angle θ, then the UE 115 may transmit the retroreflected signal of the waveform at the angle θ via the antenna element 305-*a*. Such operations may be replicated for each antenna element 305 of the antenna array 300. In this way, the UE 115 may implement the Van Atta architecture in order to transmit a retroreflected signa.

FIG. 3B. The antenna 301 may be an example of a Rotman Lens 315 that supports retroreflection beamforming. For example, the Rotman Lens 315 may be coupled with antenna elements that comprise an antenna array 325 via respective correction lines 320. Further, the Rotman Lens 315 may be connected to one or more beam ports 335.

The antenna 301 may operate in a receive mode and a transmit mode. For example, in the receive mode, a Rotman Lens 315 may receive an incoming wavefront 330 (e.g., a waveform) via the antenna array 325. The Rotman Lens 315 may be configured to identify the beam port 335 (e.g., beam port 5) associated with the angle of arrival of the incoming wavefront 330. Based on receiving the incoming wavefront 330, the antenna 301 may operate in the transmit mode in order to reflect the incoming wavefront 330. In the transmit mode, the Rotman Lens 315 may reflect the incoming wavefront 330 to transmit the beam wavefront 340, via the antenna array 325, using the identified beam port 335 (e.g., beam port 5). That is, the Rotman Lens 315 may be configured to receive the incoming wavefront 330 and reflect the incoming wavefront 330 to transmit the beam wavefront 340.

Although the Van Atta antenna array architecture and the Rotman Lens are described, it should be understood that any antenna array configuration may be implemented in the UE to support the techniques described herein.

Figure 4:
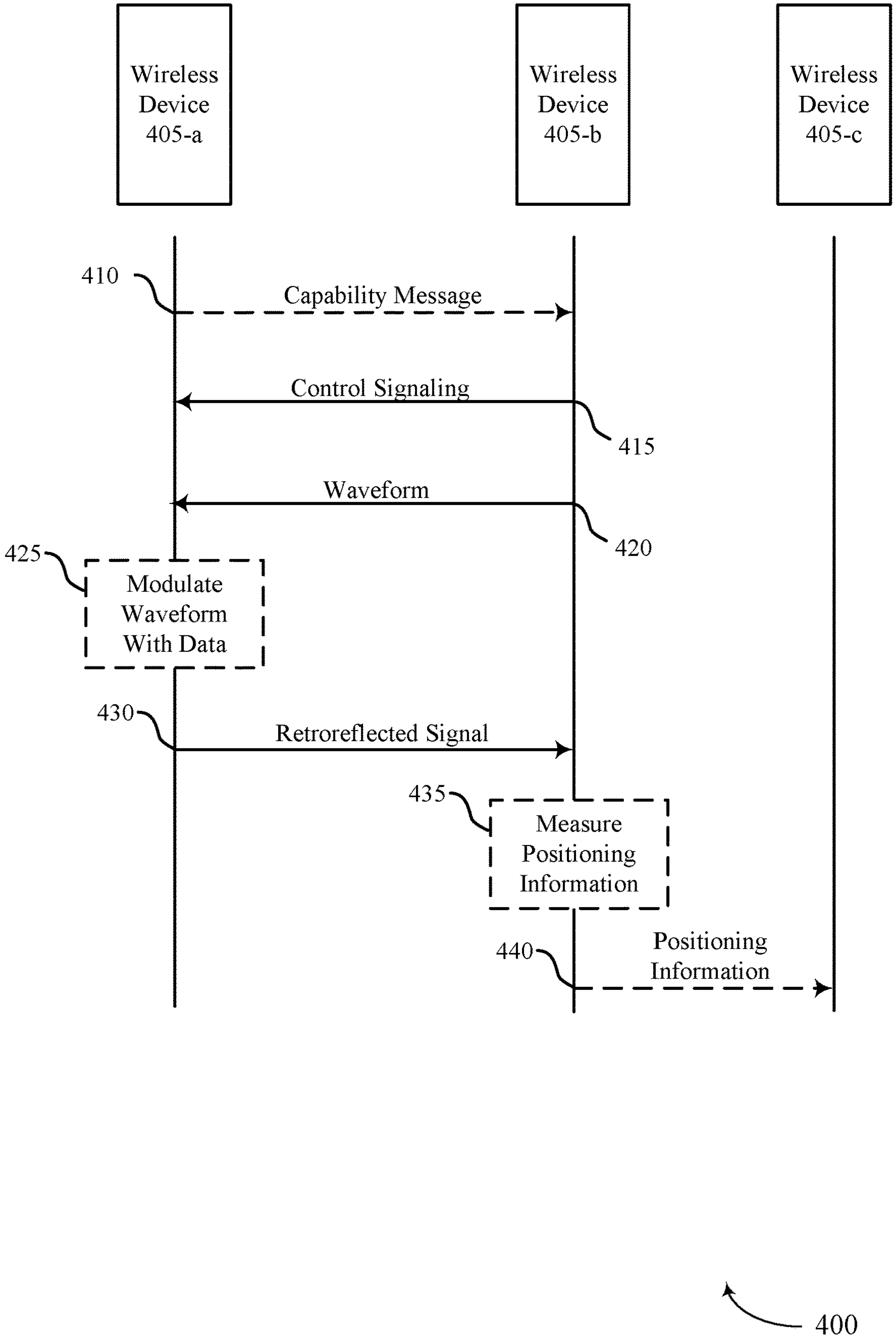
FIG. 4 shows an example of a process flow that supports techniques for retroreflection beamforming in accordance with one or more aspects of the present disclosure.

FIG. 4 shows an example of a process flow 400 that supports techniques for retroreflection beamforming in accordance with one or more aspects of the present disclosure. Aspects of the process flow 400 may implement, or be implemented by, aspects of the wireless communications system 100, the wireless communications system 200, the antenna array 300, and the antenna 301 as described herein. For example, the process flow 400 may include a wireless device 405-*a* (e.g., a first wireless device), which may be an example of the UE 115-*a* as described herein. Further, the process flow 400 may include a wireless device 405-*b* (e.g., a second wireless device), which may be an example of the network entity 105-*a* or the UE 115-*b* as described herein. Additionally, the process flow 400 may include a wireless device 405-*c* (e.g., a third wireless device), which may be an example of the network entity 105-*a* or the logical function 205 as described herein. The techniques described in the context of the process flow 400 may enable the wireless device 405-*a* to perform retroreflection communications for various operations.

At 410, the wireless device 405-*a* may transmit a capability message indicating that the wireless device 405-*a* supports retroreflection communication. In some examples, the wireless device 405-*a* may transmit the capability message to a sidelink UE (e.g., such as the UE 115-*b*) during a sidelink discovery operation or a network entity (e.g., such as the network entity 105-*a*) during broadcast or position operations as described herein with reference to FIG. 2.

At 415, in some examples, the wireless device 405-*c* may transmit control signaling (e.g., such as control signaling 210) indicating a set of resources during which the wireless device is to activate retroreflection communications between the wireless device 405-*a* and the wireless device 405-*b*.

At 420, the wireless device 405-*b* may transmit, via the set of resources, a waveform (e.g., such as a waveform 215). At 425, in some examples, the wireless device 405-*b* may receive the waveform and modulate the waveform with information as described herein with reference to FIG. 2. Such information may include an ID of the wireless device 405-*a*, waveform information, service requests of the wireless device 405-*a*, or a combination thereof.

At 430, the wireless device 405-*a* may transmit a retroreflected signal (e.g., such as the retroreflected signal 220) of the waveform. In such examples, if the wireless device 405-*a* modulated the waveform with the information, then the retroreflected signal may include the information.

At 435, the wireless device 405-*b* may measure the positioning information (e.g., such as positioning information 230) based on receiving the retroreflected signal. In such examples, the positioning information may include an angle between the wireless device 405-*a* and the wireless device 405-*b*, a delay associated with communications between the wireless device 405-*a* and the wireless device 405-*b*, doppler information associated with the communications between the wireless device 405-*a* and the wireless device 405-*b*, or a combination thereof. At 440, the wireless device 405-*b* may transmit, or otherwise report, the positioning information to the wireless device 405-*c* based on measuring the positioning information.

Figure 5:
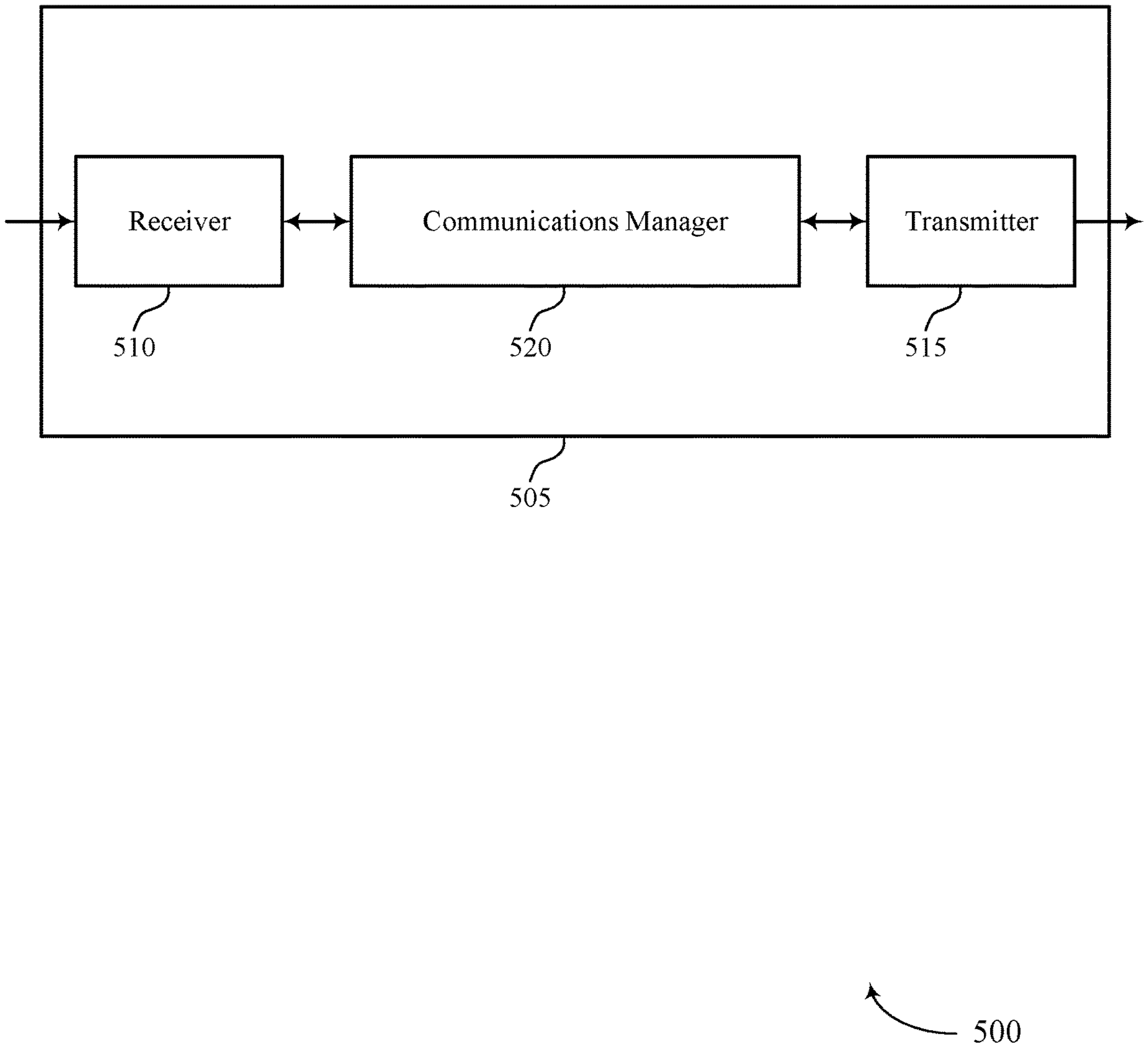
FIGS. 5 and 6 show diagrams of devices that support techniques for retroreflection beamforming in accordance with one or more aspects of the present disclosure.

FIG. 5 shows a diagram 500 of a device 505 that supports techniques for retroreflection beamforming in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for retroreflection beamforming). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for retroreflection beamforming). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for retroreflection beamforming as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first wireless device in accordance with examples as disclosed herein. For example, the communications manager 520 is capable of, configured to, or operable to support a means for receiving control signaling that indicates a set of resources during which the first wireless device activates retroreflection communications between the first wireless device and a second wireless device. The communications manager 520 is capable of, configured to, or operable to support a means for monitoring a first subset of the set of resources for a waveform in accordance with the control signaling. The communications manager 520 is capable of, configured to, or operable to support a means for transmitting, via a second subset of the set of resources, a retroreflected signal of the waveform based on monitoring for the waveform.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for a UE to perform retroreflection communications, resulting in reduced processing, reduced power consumption, and more efficient utilization of communication resources.

Figure 6:
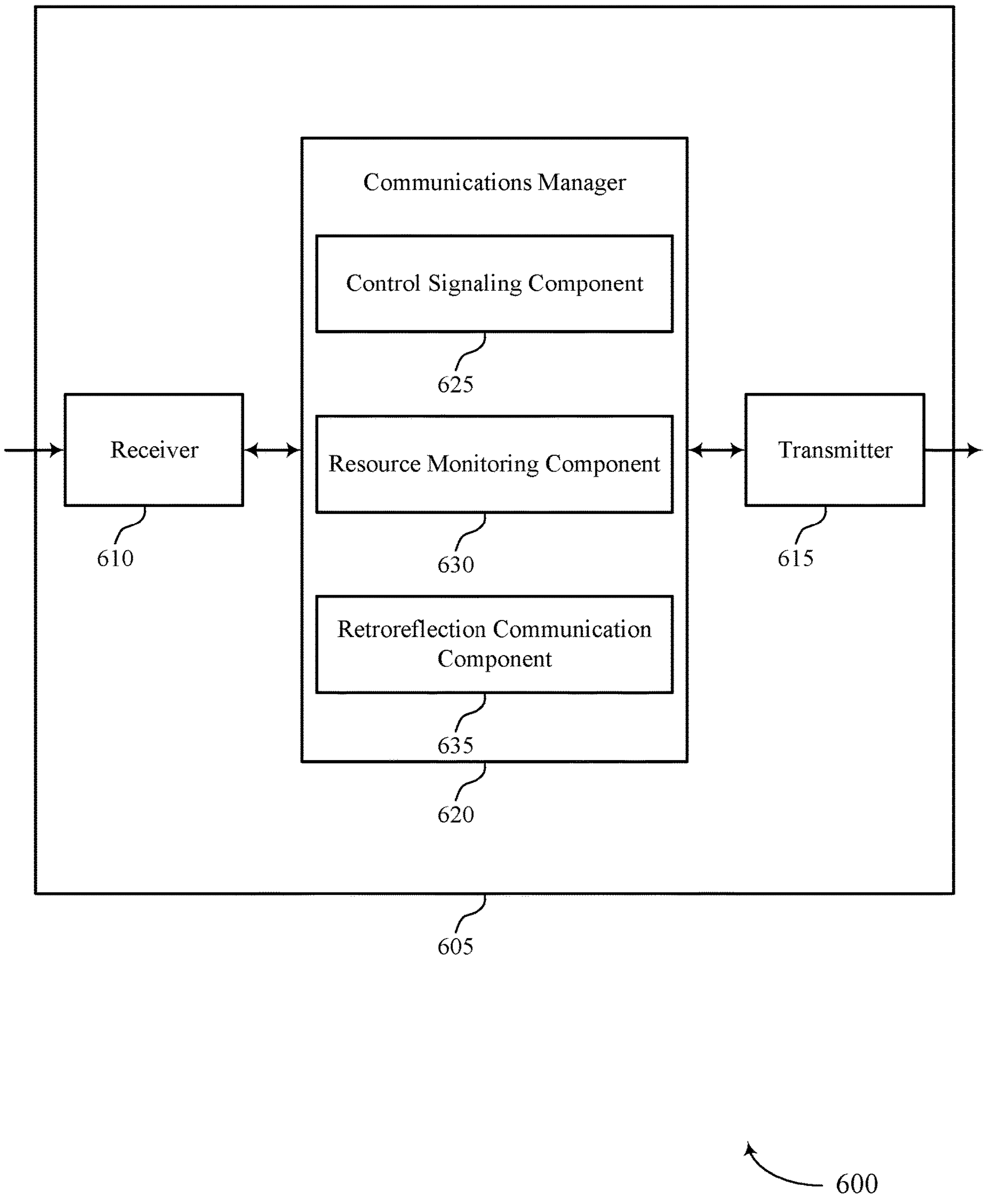

FIG. 6 shows a diagram 600 of a device 605 that supports techniques for retroreflection beamforming in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for retroreflection beamforming). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for retroreflection beamforming). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for retroreflection beamforming as described herein. For example, the communications manager 620 may include a control signaling component 625, a resource monitoring component 630, a retroreflection communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless device in accordance with examples as disclosed herein. The control signaling component 625 is capable of, configured to, or operable to support a means for receiving control signaling that indicates a set of resources during which the first wireless device activates retroreflection communications between the first wireless device and a second wireless device. The resource monitoring component 630 is capable of, configured to, or operable to support a means for monitoring a first subset of the set of resources for a waveform in accordance with the control signaling. The retroreflection communication component 635 is capable of, configured to, or operable to support a means for transmitting, via a second subset of the set of resources, a retroreflected signal of the waveform based on monitoring for the waveform.

Figure 7:
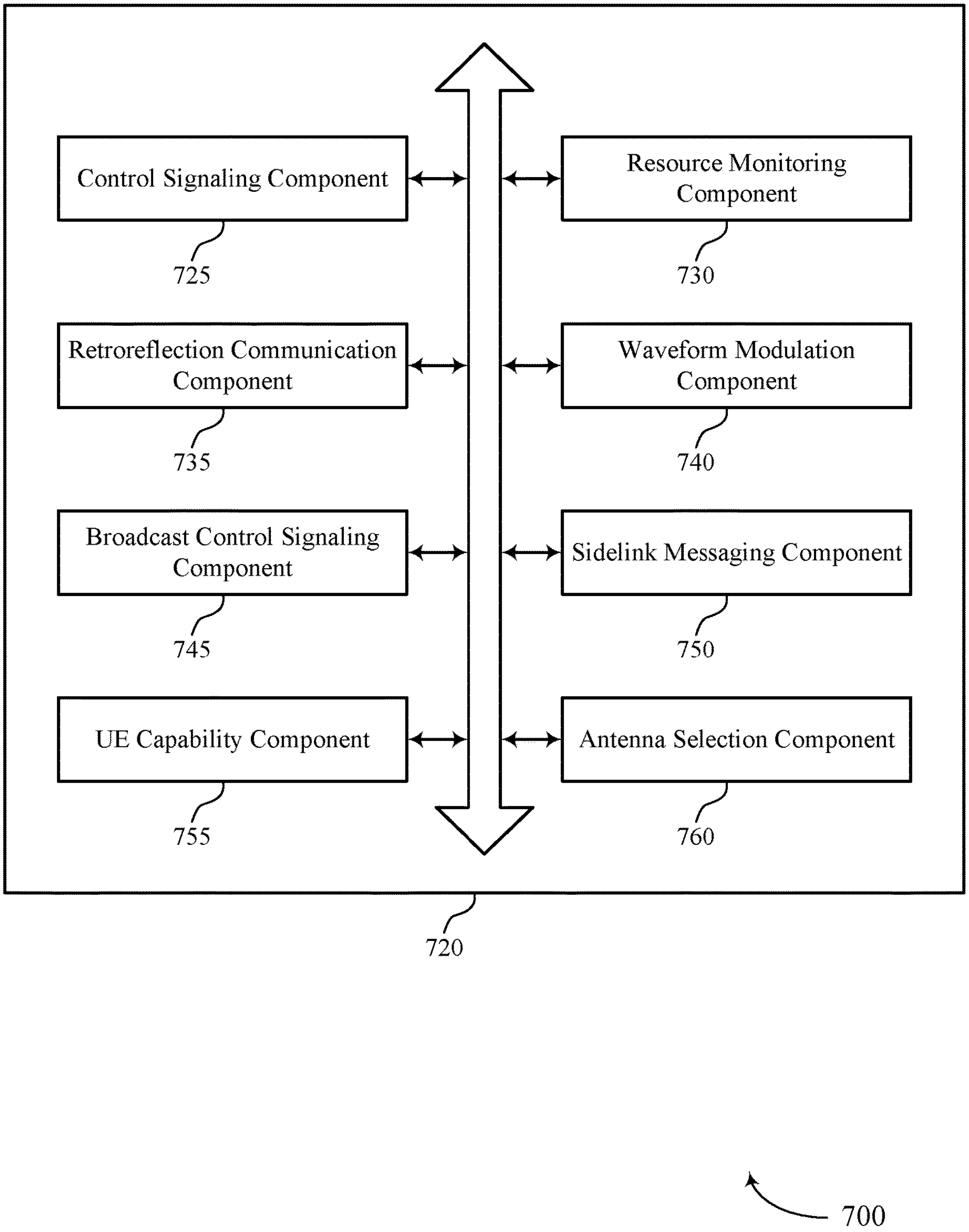
FIG. 7 shows a diagram of a communications manager that supports techniques for retroreflection beamforming in accordance with one or more aspects of the present disclosure.

FIG. 7 shows a diagram 700 of a communications manager 720 that supports techniques for retroreflection beamforming in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for retroreflection beamforming as described herein. For example, the communications manager 720 may include a control signaling component 725, a resource monitoring component 730, a retroreflection communication component 735, a waveform modulation component 740, a broadcast control signaling component 745, a sidelink messaging component 750, a UE capability component 755, an antenna selection component 760, or any combination thereof. Each of these components, or components or subcomponents thereof (e.g., one or more processors, one or more memories), may communicate, directly or indirectly, with one another (e.g., via one or more buses).

The communications manager 720 may support wireless communications at a first wireless device in accordance with examples as disclosed herein. The control signaling component 725 is capable of, configured to, or operable to support a means for receiving control signaling that indicates a set of resources during which the first wireless device activates retroreflection communications between the first wireless device and a second wireless device. The resource monitoring component 730 is capable of, configured to, or operable to support a means for monitoring a first subset of the set of resources for a waveform in accordance with the control signaling. The retroreflection communication component 735 is capable of, configured to, or operable to support a means for transmitting, via a second subset of the set of resources, a retroreflected signal of the waveform based on monitoring for the waveform.

In some examples, the waveform modulation component 740 is capable of, configured to, or operable to support a means for modulating the waveform with information based on monitoring the first subset of the set of resources, where the retroreflected signal of the waveform includes the information based on modulating the waveform with the information.

In some examples, the information includes an ID of the first wireless device, waveform information, service requests of the first wireless device, or both.

In some examples, the broadcast control signaling component 745 is capable of, configured to, or operable to support a means for receiving, from the second wireless device, a broadcast control signal based on transmitting the retroreflected signal of the waveform.

In some examples, the sidelink messaging component 750 is capable of, configured to, or operable to support a means for receiving, via a set of sidelink resources, a sidelink control message indicating that the first wireless device is to be a relay in sidelink communications between the first wireless device and the second wireless device, where receiving the sidelink control message is based on transmitting the retroreflected signal of the waveform.

In some examples, the UE capability component 755 is capable of, configured to, or operable to support a means for transmitting a capability message indicating a capability of the first wireless device to support the retroreflection communications, where receiving the control signaling is based on the capability of the first wireless device.

In some examples, the capability message further indicates supported modulation schemes for the retroreflection communications, supported frequency bands for the retroreflection communications, latency metrics associated with the retroreflection communications, a transmission gain associated with the retroreflection communications, or a combination thereof.

In some examples, the capability message further indicates whether the first wireless device supports active retroreflection communications between, a power capability associated with the active retroreflection communications, or both.

In some examples, the capability message further indicates whether the first wireless device supports concurrent retroreflection communications and actively powered communications between the first wireless device and the second wireless device or a third wireless device.

In some examples, the antenna selection component 760 is capable of, configured to, or operable to support a means for receiving, via the control signaling, an indication of an antenna array to use for the retroreflection communications, where the retroreflected signal of the waveform is transmitted via the antenna array.

In some examples, activation of the retroreflection communications is based on a cell associated with the second wireless device, a channel raster associated with a channel between the first wireless device and the second wireless device, or both.

In some examples, the first subset of the set of resources is associated with a first frequency band and the second subset of the set of resources is associated with a second frequency band different from the first frequency band.

In some examples, the first subset of the set of resources and the second subset of the set of resources are associated with a same frequency band.

In some examples, the first wireless device is operating in a connected mode of operation, and the control signaling is received via a RRC message, a MAC-CE, DCI, or a combination thereof.

In some examples, the first wireless device is operating in one or both of an idle mode of operation or an inactive mode of operation, and the control signaling is received via a SI transmission.

Figure 8:
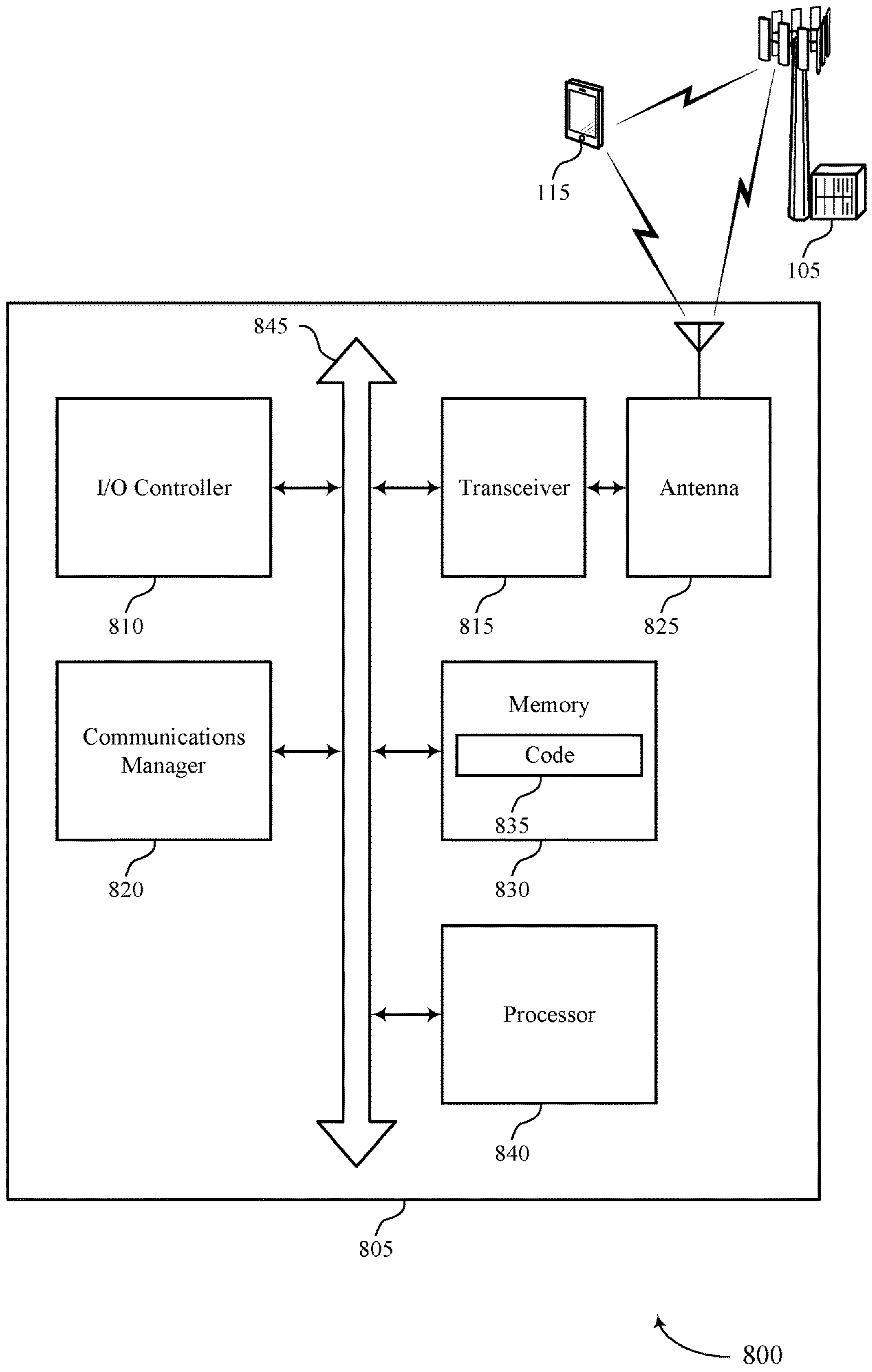
FIG. 8 shows a diagram of a system including a device that supports techniques for retroreflection beamforming in accordance with one or more aspects of the present disclosure.

FIG. 8 shows a diagram of a system 800 including a device 805 that supports techniques for retroreflection beamforming in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for retroreflection beamforming). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications at a first wireless device in accordance with examples as disclosed herein. For example, the communications manager 820 is capable of, configured to, or operable to support a means for receiving control signaling that indicates a set of resources during which the first wireless device activates retroreflection communications between the first wireless device and a second wireless device. The communications manager 820 is capable of, configured to, or operable to support a means for monitoring a first subset of the set of resources for a waveform in accordance with the control signaling. The communications manager 820 is capable of, configured to, or operable to support a means for transmitting, via a second subset of the set of resources, a retroreflected signal of the waveform based on monitoring for the waveform.

By including or configuring the communications manager 820 in accordance with examples as described herein, the device 805 may support techniques for a UE to perform retroreflection communications, resulting in reduced power consumption and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for retroreflection beamforming as described herein, or the at least one processor 840 and the at least one memory 830 may be otherwise configured to, individually or collectively, perform or support such operations.

Figure 9:
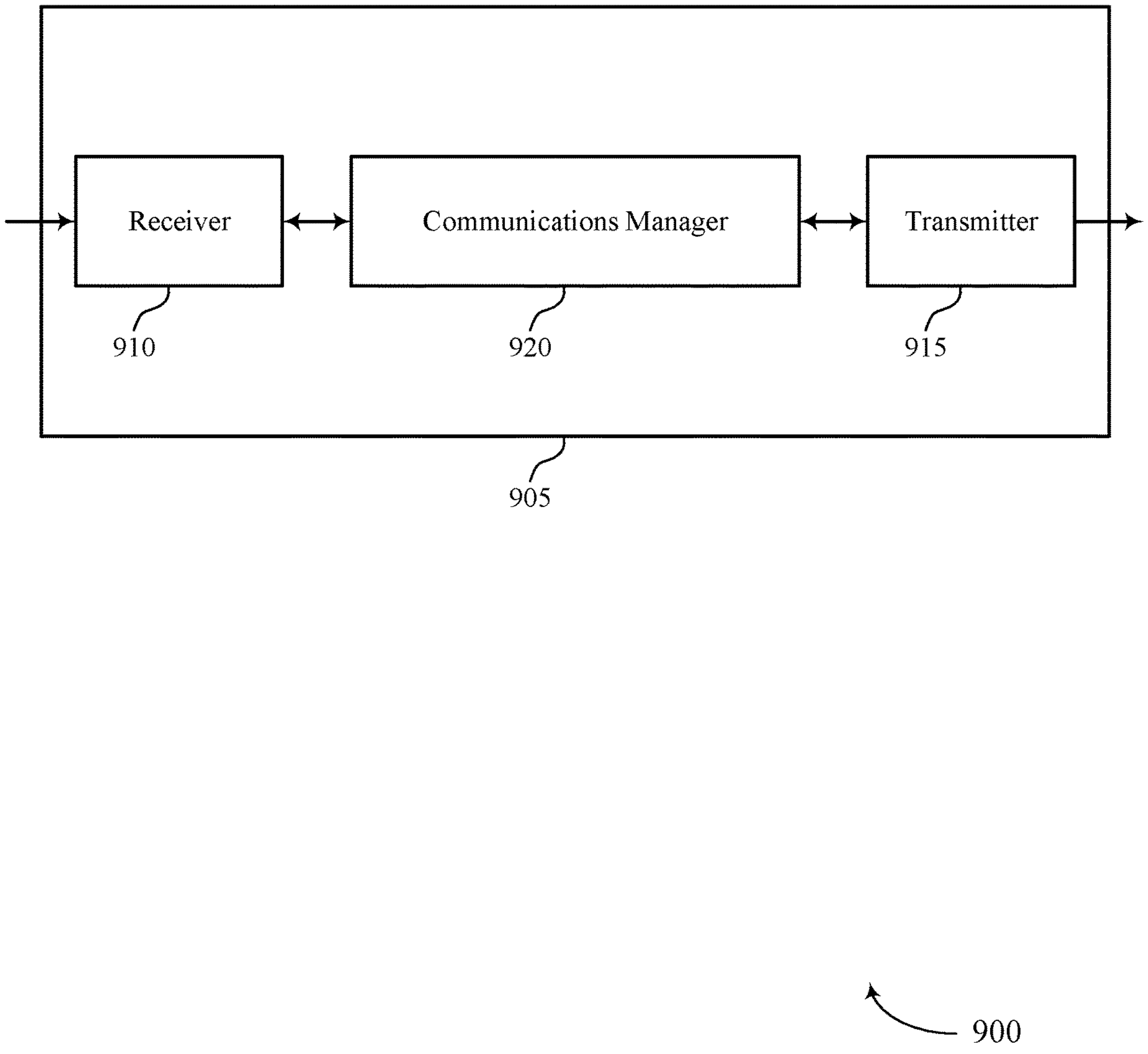
FIGS. 9 and 10 show diagrams of devices that support techniques for retroreflection beamforming in accordance with one or more aspects of the present disclosure.

FIG. 9 shows a diagram 900 of a device 905 that supports techniques for retroreflection beamforming in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for retroreflection beamforming as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting control signaling that indicates a set of resources during which a first wireless device activates retroreflection communications between the first wireless device and a second wireless device. The communications manager 920 is capable of, configured to, or operable to support a means for transmitting, via a first subset of the set of resources, a waveform in accordance with the control signaling. The communications manager 920 is capable of, configured to, or operable to support a means for receiving, via a second subset of the set of resources, a retroreflected signal of the waveform based on transmitting the waveform.

For example, the communications manager 920 is capable of, configured to, or operable to support a means for identifying a first wireless device and a second wireless device that support retroreflection communications. The communications manager 920 is capable of, configured to, or operable to support a means for transmitting, to the second wireless device and based on identifying of the second wireless device, a message indicating a set of resources for the retroreflection communications with the first wireless device.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for a UE to perform retroreflection communications, resulting in reduced processing, reduced power consumption, and more efficient utilization of communication resources.

Figure 10:
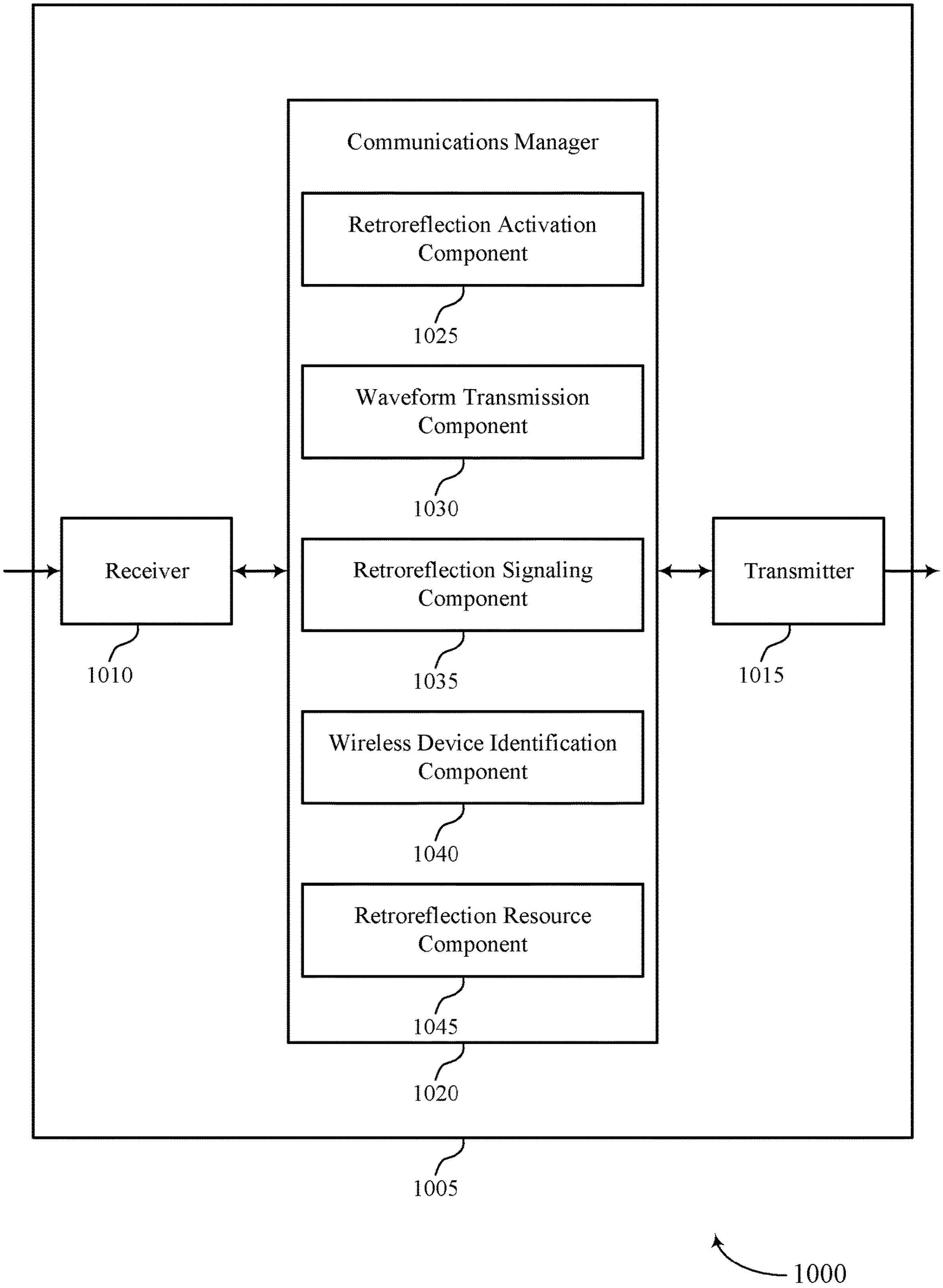

FIG. 10 shows a diagram 1000 of a device 1005 that supports techniques for retroreflection beamforming in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for retroreflection beamforming as described herein. For example, the communications manager 1020 may include a retroreflection activation component 1025, a waveform transmission component 1030, a retroreflection signaling component 1035, a wireless device identification component 1040, a retroreflection resource component 1045, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The retroreflection activation component 1025 is capable of, configured to, or operable to support a means for transmitting control signaling that indicates a set of resources during which a first wireless device activates retroreflection communications between the first wireless device and a second wireless device. The waveform transmission component 1030 is capable of, configured to, or operable to support a means for transmit, via a first subset of the set of resources, a waveform in accordance with the control signaling. The retroreflection signaling component 1035 is capable of, configured to, or operable to support a means for receiving, via a second subset of the set of resources, a retroreflected signal of the waveform based on transmitting the waveform.

The wireless device identification component 1040 is capable of, configured to, or operable to support a means for identifying a first wireless device and a second wireless device that support retroreflection communications. The retroreflection resource component 1045 is capable of, configured to, or operable to support a means for transmitting, to the second wireless device and based on identifying of the second wireless device, a message indicating a set of resources for the retroreflection communications with the first wireless device.

Figure 11:
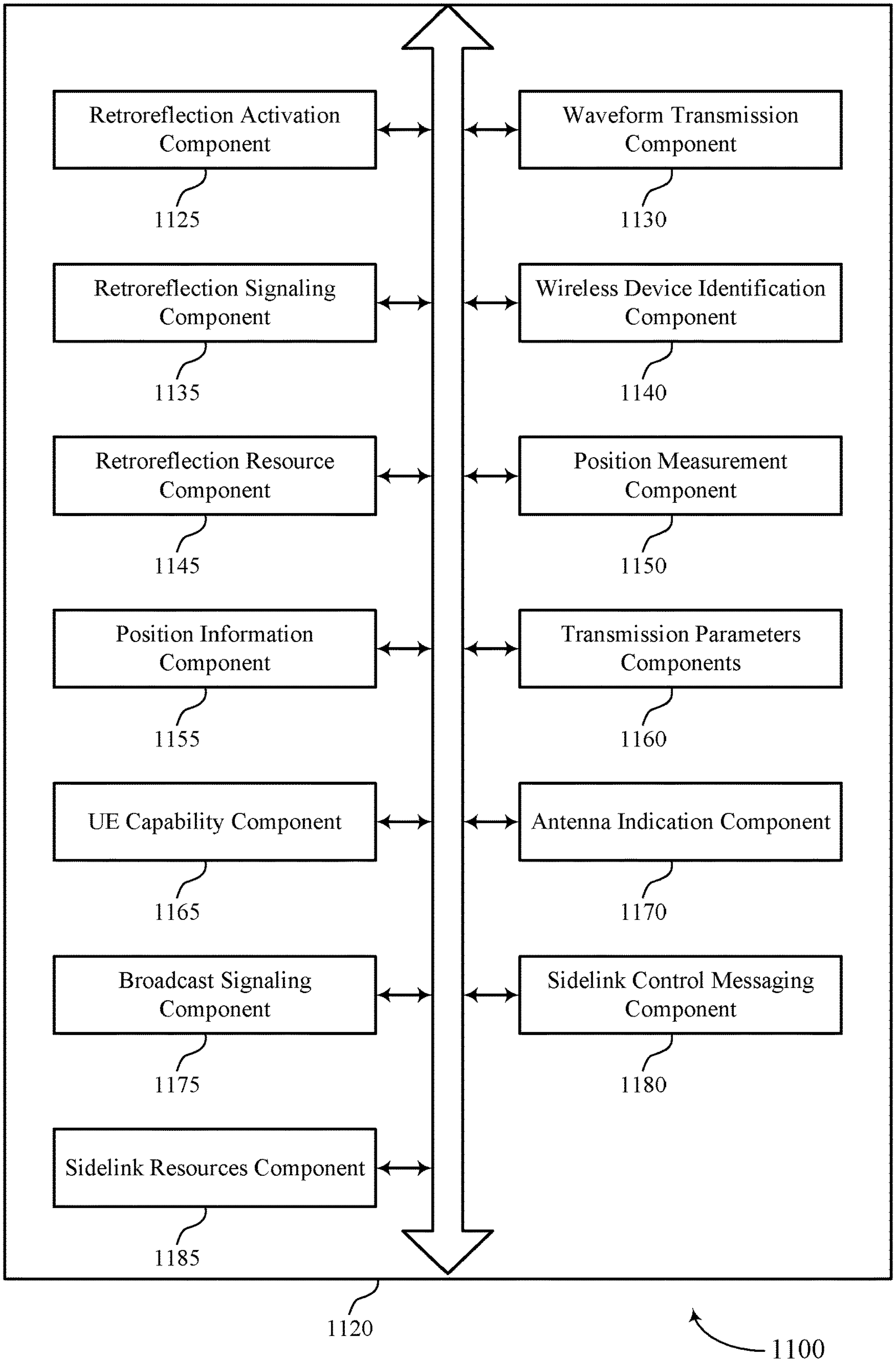
FIG. 11 shows a diagram of a communications manager that supports techniques for retroreflection beamforming in accordance with one or more aspects of the present disclosure.

FIG. 11 shows a diagram 1100 of a communications manager 1120 that supports techniques for retroreflection beamforming in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for retroreflection beamforming as described herein. For example, the communications manager 1120 may include a retroreflection activation component 1125, a waveform transmission component 1130, a retroreflection signaling component 1135, a wireless device identification component 1140, a retroreflection resource component 1145, a position measurement component 1150, a position information component 1155, a transmission parameters components 1160, a UE capability component 1165, an antenna indication component 1170, a broadcast signaling component 1175, a sidelink control messaging component 1180, a sidelink resources component 1185, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The retroreflection activation component 1125 is capable of, configured to, or operable to support a means for transmitting control signaling that indicates a set of resources during which a first wireless device activates retroreflection communications between the first wireless device and a second wireless device. The waveform transmission component 1130 is capable of, configured to, or operable to support a means for transmit, via a first subset of the set of resources, a waveform in accordance with the control signaling. The retroreflection signaling component 1135 is capable of, configured to, or operable to support a means for receiving, via a second subset of the set of resources, a retroreflected signal of the waveform based on transmitting the waveform.

In some examples, the position measurement component 1150 is capable of, configured to, or operable to support a means for measuring positioning information associated with the first wireless device based on receiving the retroreflected signal of the waveform. In some examples, the position information component 1155 is capable of, configured to, or operable to support a means for transmitting the positioning information associated with the first wireless device to a third wireless device based on measuring the positioning information.

In some examples, the broadcast signaling component 1175 is capable of, configured to, or operable to support a means for transmitting a broadcast control signal in a direction of the first wireless device, the direction being based on the positioning information.

In some examples, the sidelink control messaging component 1180 is capable of, configured to, or operable to support a means for transmitting, via a set of sidelink resources, a sidelink control message indicating that the first wireless device is to be a relay in sidelink communications, where transmitting the sidelink control message is based on receiving the retroreflected signal of the waveform and the positioning information.

In some examples, the positioning information includes an angle between the first wireless device and the second wireless device, a delay associated with communications between the first wireless device and the second wireless device, doppler information associated with the communications between the first wireless device and the second wireless device, or a combination thereof.

In some examples, the transmission parameters components 1160 is capable of, configured to, or operable to support a means for receiving, from a third wireless device, a message indicating the set of resources for the retroreflection communications, the message further indicating a set of transmission parameters for transmission of the waveform from the second wireless device to the first wireless device, where transmitting the control signaling is in accordance with receiving the set of resources, and where transmitting the waveform is in accordance with the set of transmission parameters.

In some examples, the set of transmission parameters include a waveform configuration, a transmission power of the waveform, an ID associated with the first wireless device, or a combination thereof.

In some examples, the UE capability component 1165 is capable of, configured to, or operable to support a means for receiving a capability message indicating a capability of the first wireless device to support the retroreflection communications, where transmitting the control signaling is based on the capability of the first wireless device.

In some examples, the antenna indication component 1170 is capable of, configured to, or operable to support a means for transmitting, via the control signaling, an indication of an antenna array to use for the retroreflection communications.

In some examples, the retroreflected signal of the waveform includes information from the first wireless device, the information including an ID of the first wireless device, waveform information, service requests of the first wireless device, or a combination thereof.

The wireless device identification component 1140 is capable of, configured to, or operable to support a means for identifying a first wireless device and a second wireless device that support retroreflection communications. The retroreflection resource component 1145 is capable of, configured to, or operable to support a means for transmitting, to the second wireless device and based on identifying of the second wireless device, a message indicating a set of resources for the retroreflection communications with the first wireless device.

In some examples, the transmission parameters components 1160 is capable of, configured to, or operable to support a means for transmitting, via the message, an indication of a set of transmission parameters for transmission of a waveform from the second wireless device to the first wireless device.

In some examples, the set of transmission parameters include a waveform configuration, a transmission power of the waveform, an ID associated with the first wireless device, or a combination thereof.

In some examples, the position information component 1155 is capable of, configured to, or operable to support a means for receiving, from the second wireless device, an indication of positioning information associated with the first wireless device, where the positioning information includes an angle between the first wireless device and the second wireless device, a delay associated with communications between the first wireless device and the second wireless device, doppler information associated with the communications between the first wireless device and the second wireless device, or a combination thereof.

In some examples, the sidelink resources component 1185 is capable of, configured to, or operable to support a means for transmitting, to the second wireless device, a message indicating of a set of sidelink resources for sidelink communications between the first wireless device and the second wireless device based on receiving the positioning information.

Figure 12:
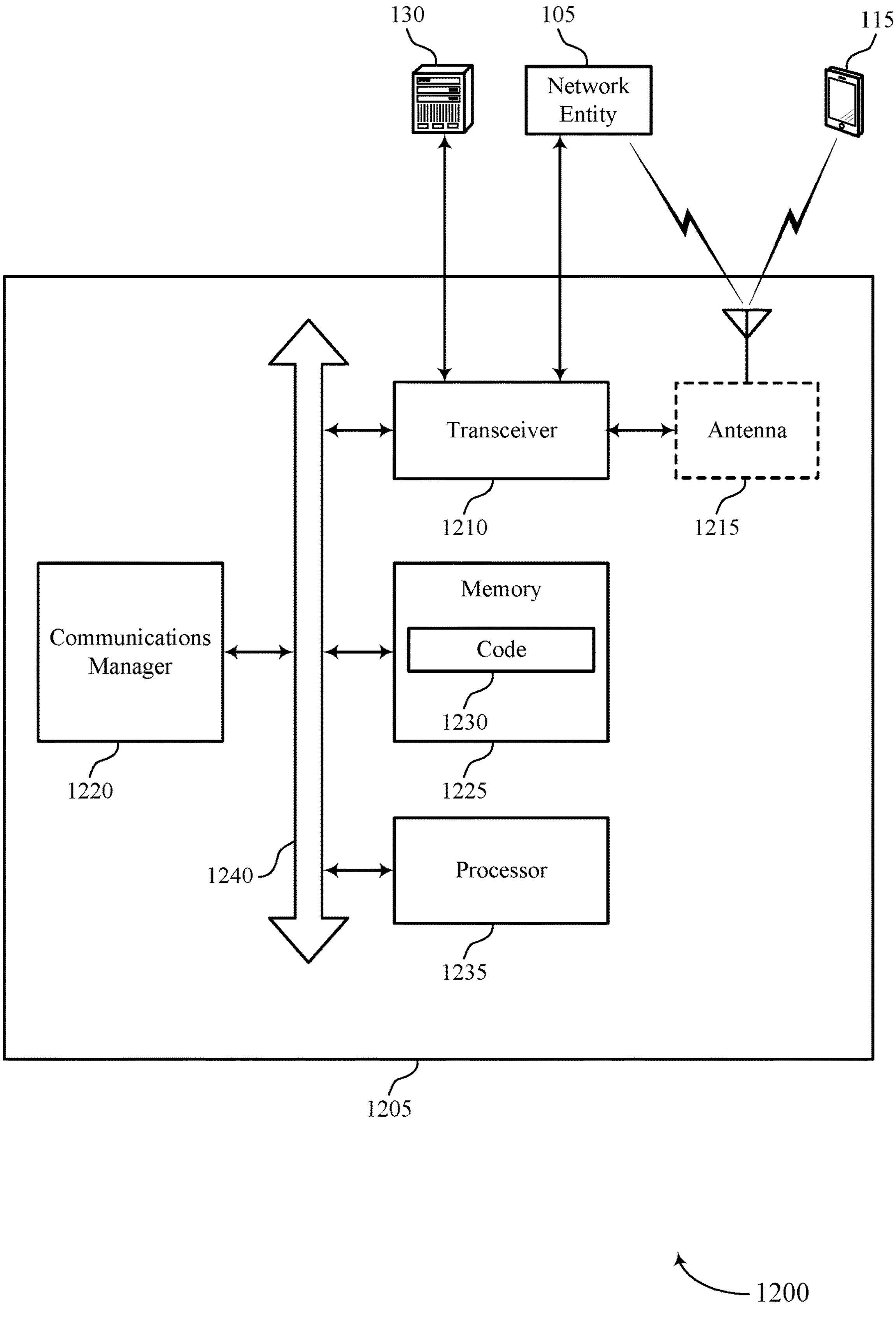
FIG. 12 shows a diagram of a system including a device that supports techniques for retroreflection beamforming in accordance with one or more aspects of the present disclosure.

FIG. 12 shows a diagram of a system 1200 including a device 1205 that supports techniques for retroreflection beamforming in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting techniques for retroreflection beamforming). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting control signaling that indicates a set of resources during which a first wireless device activates retroreflection communications between the first wireless device and a second wireless device. The communications manager 1220 is capable of, configured to, or operable to support a means for transmitting, via a first subset of the set of resources, a waveform in accordance with the control signaling. The communications manager 1220 is capable of, configured to, or operable to support a means for receiving, via a second subset of the set of resources, a retroreflected signal of the waveform based on transmitting the waveform.

For example, the communications manager 1220 is capable of, configured to, or operable to support a means for identifying a first wireless device and a second wireless device that support retroreflection communications. The communications manager 1220 is capable of, configured to, or operable to support a means for transmitting, to the second wireless device and based on identifying of the second wireless device, a message indicating a set of resources for the retroreflection communications with the first wireless device.

By including or configuring the communications manager 1220 in accordance with examples as described herein, the device 1205 may support techniques for a UE to perform retroreflection communications reduced power consumption and more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of techniques for retroreflection beamforming as described herein, or the at least one processor 1235 and the at least one memory 1225 may be otherwise configured to, individually or collectively, perform or support such operations.

Figure 13:
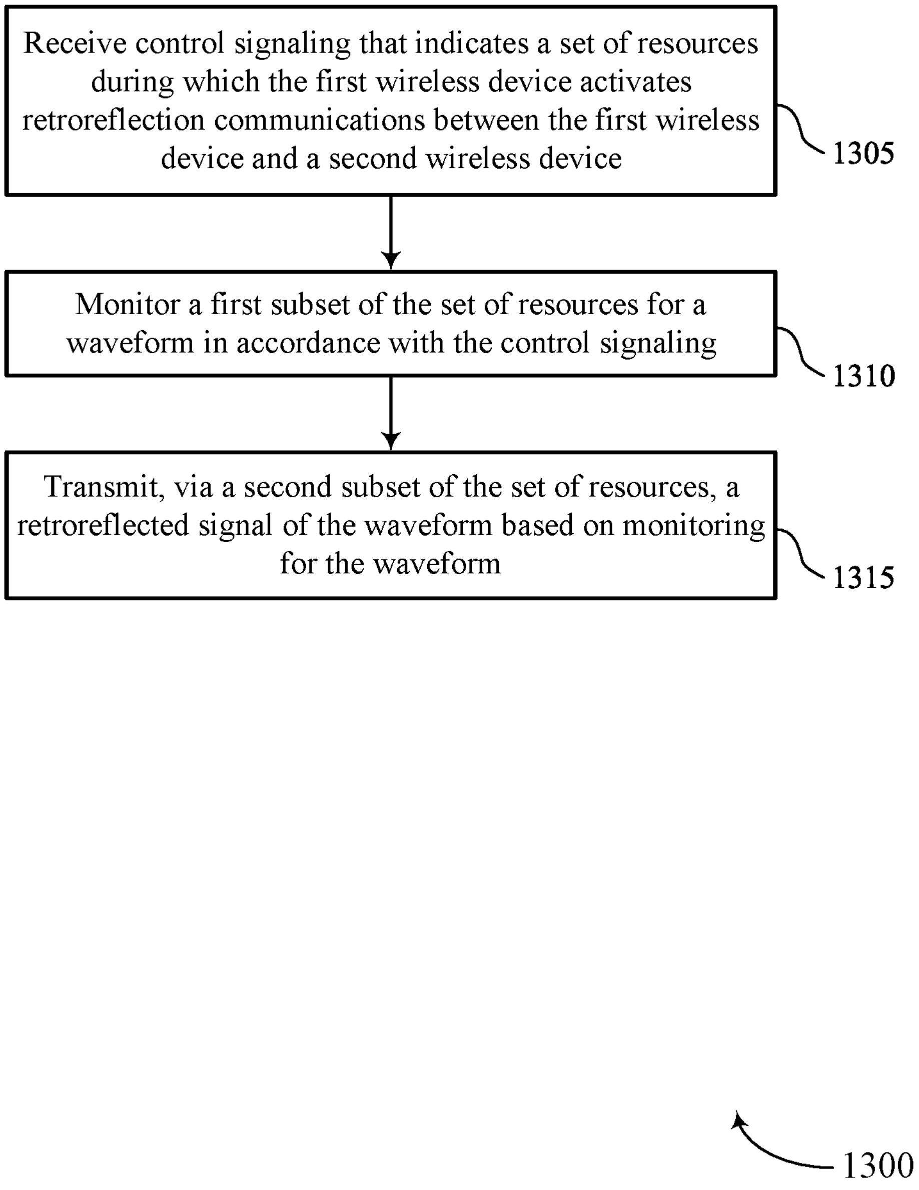
FIGS. 13 through 18 show flowcharts illustrating methods that support techniques for retroreflection beamforming in accordance with one or more aspects of the present disclosure.

FIG. 13 shows a flowchart illustrating a method 1300 that supports techniques for retroreflection beamforming in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling that indicates a set of resources during which the first wireless device activates retroreflection communications between the first wireless device and a second wireless device. The operations of 1305 may be performed in accordance with examples as disclosed herein. In some examples, aspects of the operations of 1305 may be performed by a control signaling component 725 as described with reference to FIG. 7.

At 1310, the method may include monitoring a first subset of the set of resources for a waveform in accordance with the control signaling. The operations of 1310 may be performed in accordance with examples as disclosed herein. In some examples, aspects of the operations of 1310 may be performed by a resource monitoring component 730 as described with reference to FIG. 7.

At 1315, the method may include transmitting, via a second subset of the set of resources, a retroreflected signal of the waveform based on monitoring for the waveform. The operations of 1315 may be performed in accordance with examples as disclosed herein. In some examples, aspects of the operations of 1315 may be performed by a retroreflection communication component 735 as described with reference to FIG. 7.

Figure 14:
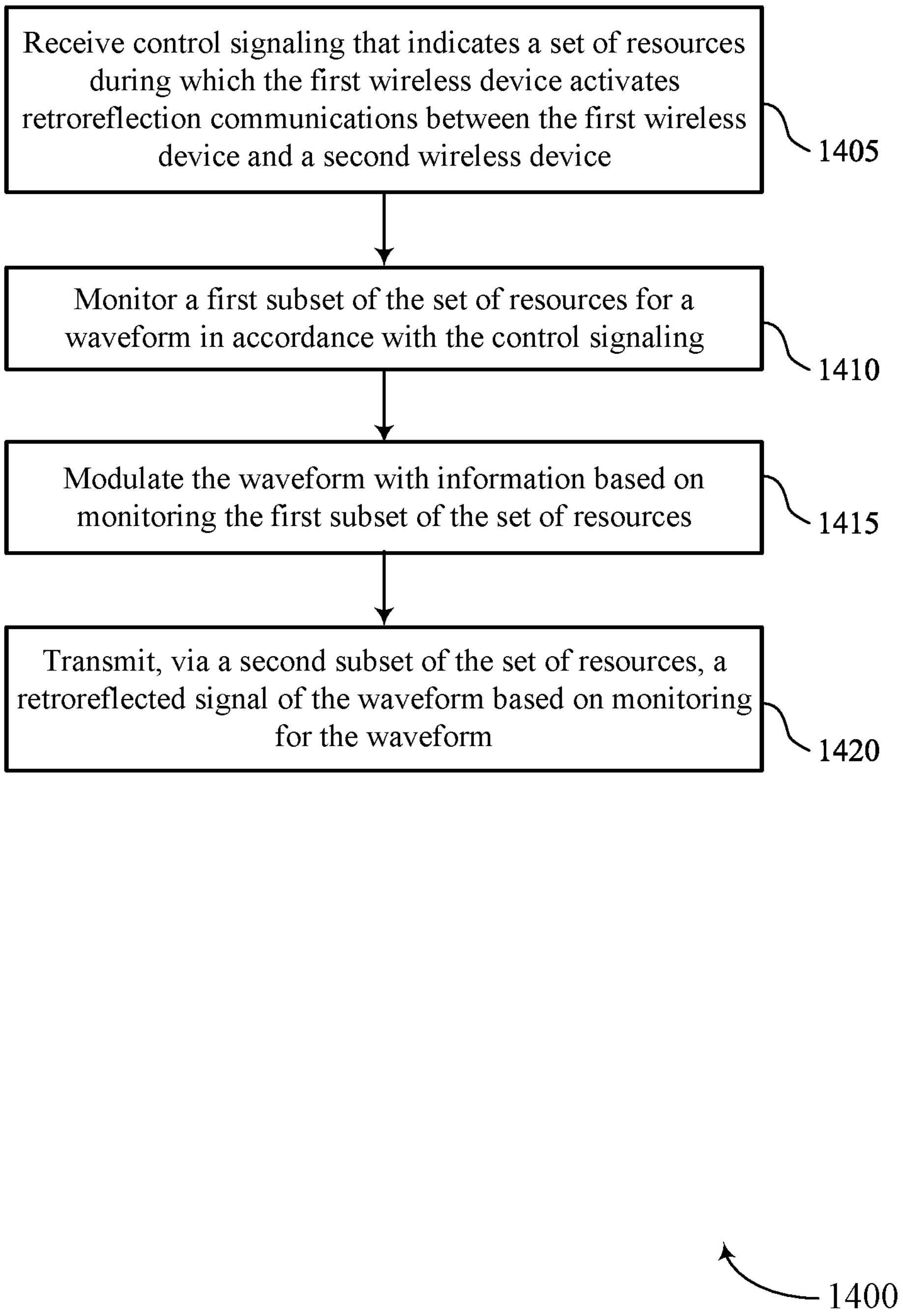

FIG. 14 shows a flowchart illustrating a method 1400 that supports techniques for retroreflection beamforming in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that indicates a set of resources during which the first wireless device activates retroreflection communications between the first wireless device and a second wireless device. The operations of 1405 may be performed in accordance with examples as disclosed herein. In some examples, aspects of the operations of 1405 may be performed by a control signaling component 725 as described with reference to FIG. 7.

At 1410, the method may include monitoring a first subset of the set of resources for a waveform in accordance with the control signaling. The operations of 1410 may be performed in accordance with examples as disclosed herein. In some examples, aspects of the operations of 1410 may be performed by a resource monitoring component 730 as described with reference to FIG. 7.

At 1415, the method may include modulating the waveform with information based on monitoring the first subset of the set of resources. The operations of 1415 may be performed in accordance with examples as disclosed herein. In some examples, aspects of the operations of 1415 may be performed by a waveform modulation component 740 as described with reference to FIG. 7.

At 1420, the method may include transmitting, via a second subset of the set of resources, a retroreflected signal of the waveform, where the retroreflected signal of the waveform includes the information based on modulating the waveform with the information. The operations of 1420 may be performed in accordance with examples as disclosed herein. In some examples, aspects of the operations of 1420 may be performed by a retroreflection communication component 735 as described with reference to FIG. 7.

Figure 15:
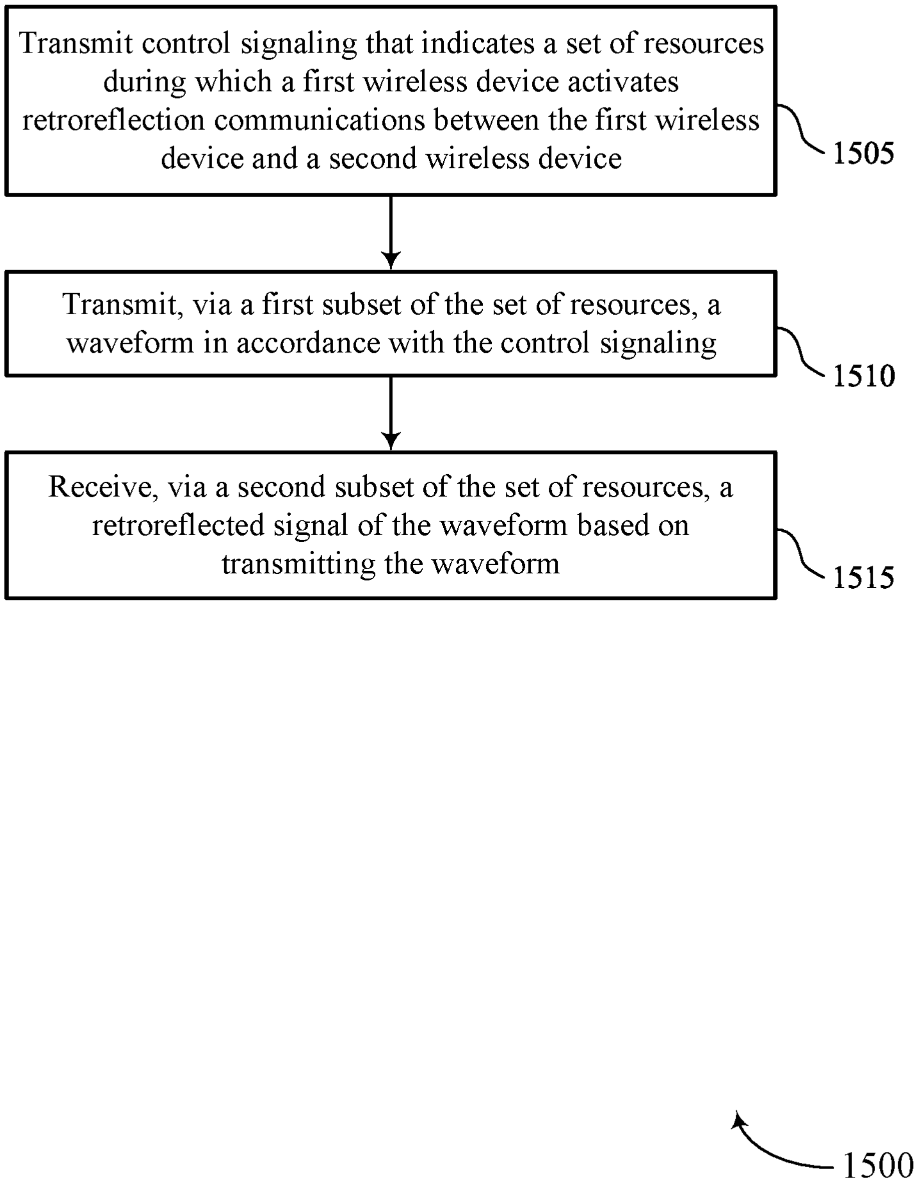

FIG. 15 shows a flowchart illustrating a method 1500 that supports techniques for retroreflection beamforming in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling that indicates a set of resources during which a first wireless device activates retroreflection communications between the first wireless device and a second wireless device. The operations of 1505 may be performed in accordance with examples as disclosed herein. In some examples, aspects of the operations of 1505 may be performed by a retroreflection activation component 1125 as described with reference to FIG. 11.

At 1510, the method may include transmit, via a first subset of the set of resources, a waveform in accordance with the control signaling. The operations of 1510 may be performed in accordance with examples as disclosed herein. In some examples, aspects of the operations of 1510 may be performed by a waveform transmission component 1130 as described with reference to FIG. 11.

At 1515, the method may include receiving, via a second subset of the set of resources, a retroreflected signal of the waveform based on transmitting the waveform. The operations of 1515 may be performed in accordance with examples as disclosed herein. In some examples, aspects of the operations of 1515 may be performed by a retroreflection signaling component 1135 as described with reference to FIG. 11.

Figure 16:
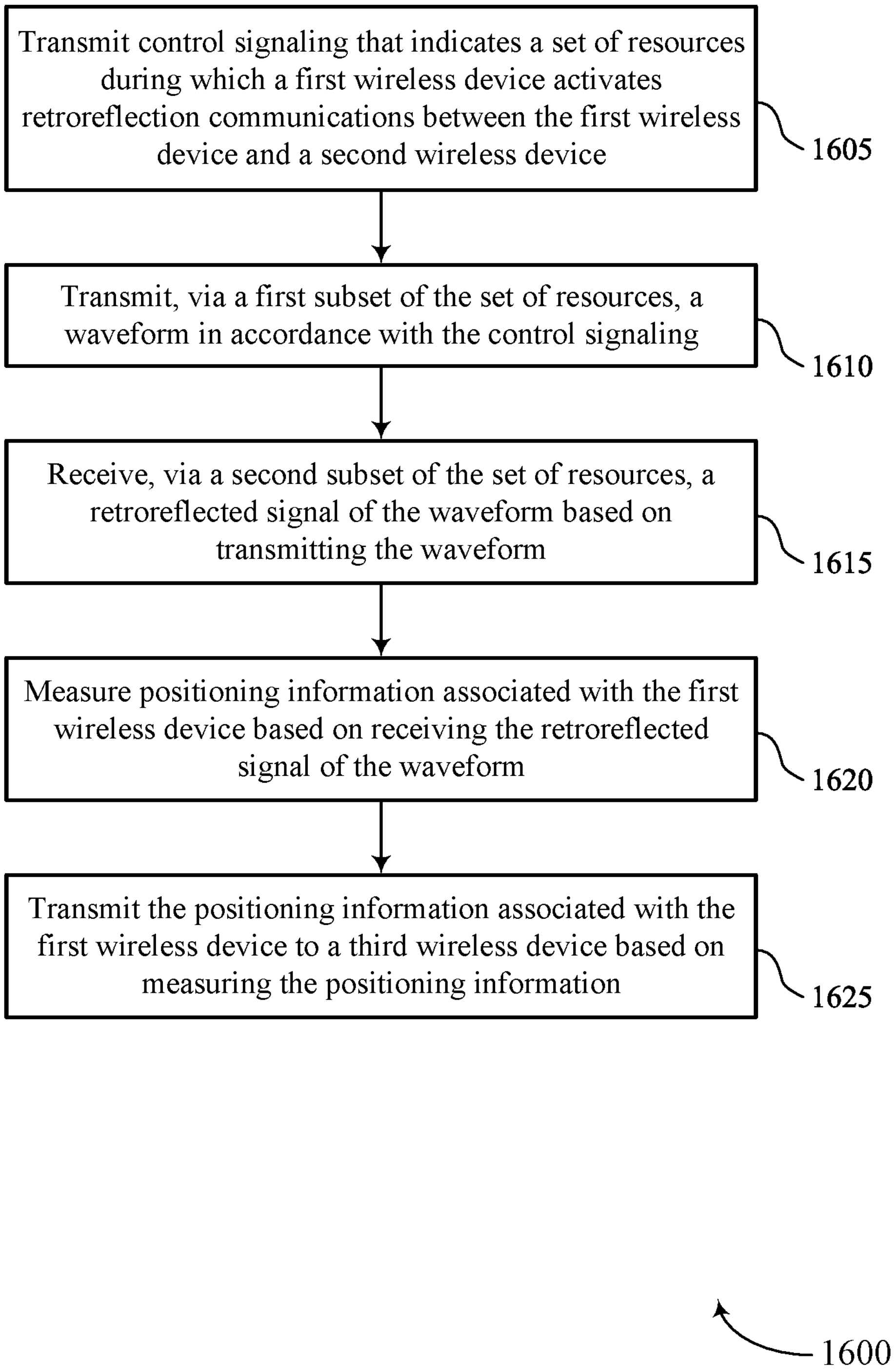

FIG. 16 shows a flowchart illustrating a method 1600 that supports techniques for retroreflection beamforming in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling that indicates a set of resources during which a first wireless device activates retroreflection communications between the first wireless device and a second wireless device. The operations of 1605 may be performed in accordance with examples as disclosed herein. In some examples, aspects of the operations of 1605 may be performed by a retroreflection activation component 1125 as described with reference to FIG. 11.

At 1610, the method may include transmit, via a first subset of the set of resources, a waveform in accordance with the control signaling. The operations of 1610 may be performed in accordance with examples as disclosed herein. In some examples, aspects of the operations of 1610 may be performed by a waveform transmission component 1130 as described with reference to FIG. 11.

At 1615, the method may include receiving, via a second subset of the set of resources, a retroreflected signal of the waveform based on transmitting the waveform. The operations of 1615 may be performed in accordance with examples as disclosed herein. In some examples, aspects of the operations of 1615 may be performed by a retroreflection signaling component 1135 as described with reference to FIG. 11.

At 1620, the method may include measuring positioning information associated with the first wireless device based on receiving the retroreflected signal of the waveform. The operations of 1620 may be performed in accordance with examples as disclosed herein. In some examples, aspects of the operations of 1620 may be performed by a position measurement component 1150 as described with reference to FIG. 11.

At 1625, the method may include transmitting the positioning information associated with the first wireless device to a third wireless device based on measuring the positioning information. The operations of 1625 may be performed in accordance with examples as disclosed herein. In some examples, aspects of the operations of 1625 may be performed by a position information component 1155 as described with reference to FIG. 11.

Figure 17:
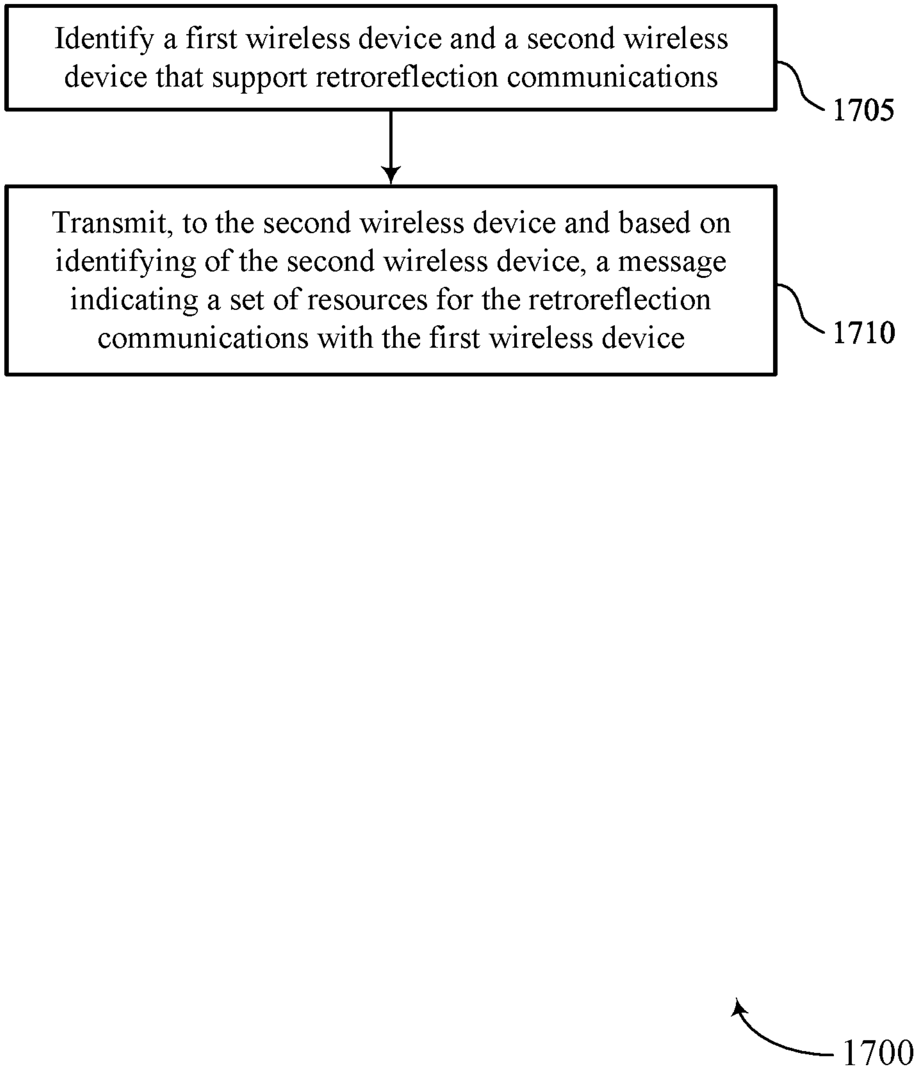

FIG. 17 shows a flowchart illustrating a method 1700 that supports techniques for retroreflection beamforming in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include identifying a first wireless device and a second wireless device that support retroreflection communications. The operations of 1705 may be performed in accordance with examples as disclosed herein. In some examples, aspects of the operations of 1705 may be performed by a wireless device identification component 1140 as described with reference to FIG. 11.

At 1710, the method may include transmitting, to the second wireless device and based on identifying of the second wireless device, a message indicating a set of resources for the retroreflection communications with the first wireless device. The operations of 1710 may be performed in accordance with examples as disclosed herein. In some examples, aspects of the operations of 1710 may be performed by a retroreflection resource component 1145 as described with reference to FIG. 11.

Figure 18:
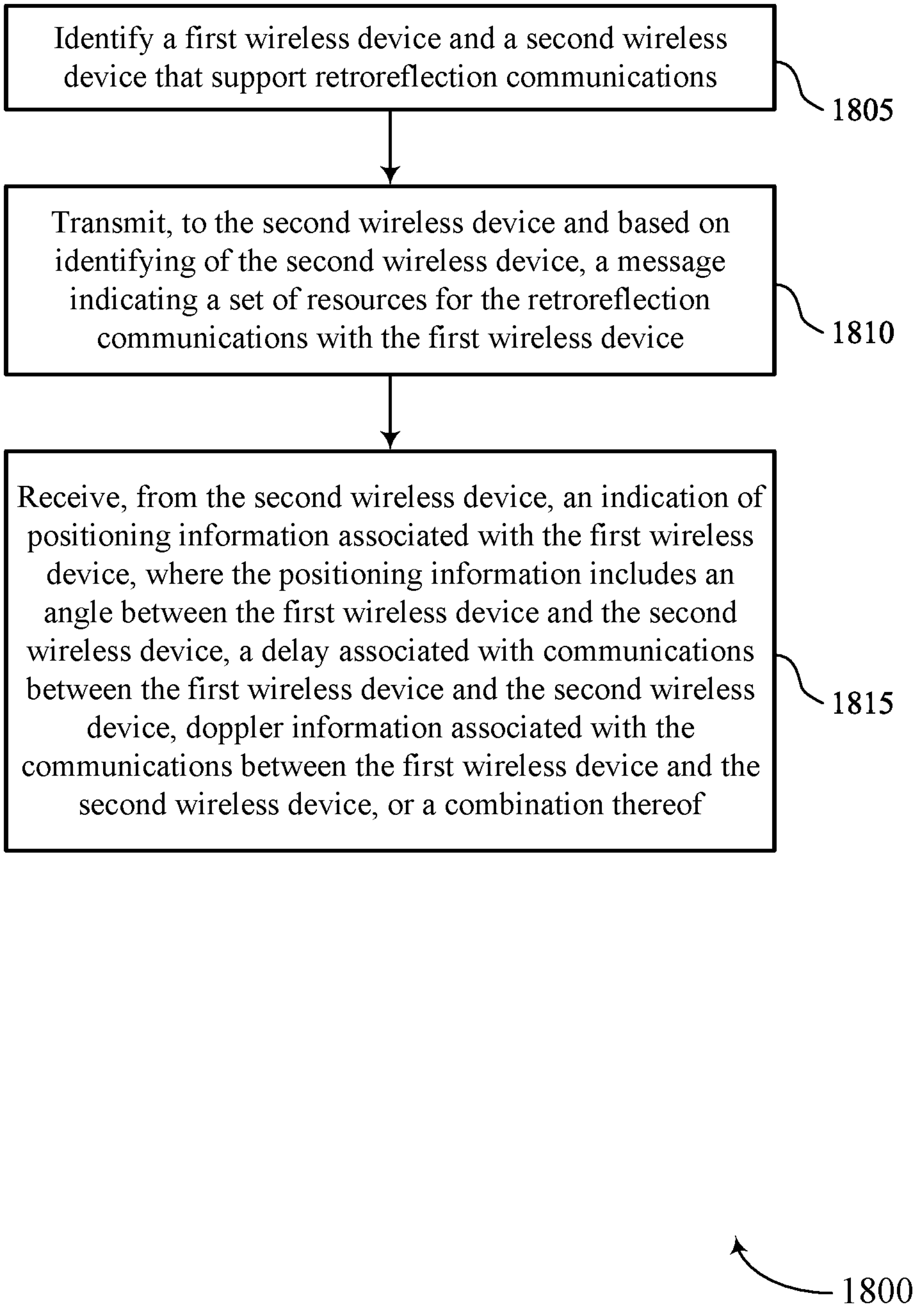

FIG. 18 shows a flowchart illustrating a method 1800 that supports techniques for retroreflection beamforming in accordance with aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include identifying a first wireless device and a second wireless device that support retroreflection communications. The operations of 1805 may be performed in accordance with examples as disclosed herein. In some examples, aspects of the operations of 1805 may be performed by a wireless device identification component 1140 as described with reference to FIG. 11.

At 1810, the method may include transmitting, to the second wireless device and based on identifying of the second wireless device, a message indicating a set of resources for the retroreflection communications with the first wireless device. The operations of 1810 may be performed in accordance with examples as disclosed herein. In some examples, aspects of the operations of 1810 may be performed by a retroreflection resource component 1145 as described with reference to FIG. 11.

At 1815, the method may include receiving, from the second wireless device, an indication of positioning information associated with the first wireless device, where the positioning information includes an angle between the first wireless device and the second wireless device, a delay associated with communications between the first wireless device and the second wireless device, doppler information associated with the communications between the first wireless device and the second wireless device, or a combination thereof. The operations of 1815 may be performed in accordance with examples as disclosed herein. In some examples, aspects of the operations of 1815 may be performed by a position information component 1155 as described with reference to FIG. 11.

The following provides an overview of aspects of the present disclosure:

Aspect 1: A method for wireless communications at a first wireless device, comprising: receiving control signaling that indicates a set of resources during which the first wireless device activates retroreflection communications between the first wireless device and a second wireless device; monitoring a first subset of the set of resources for a waveform in accordance with the control signaling; and transmitting, via a second subset of the set of resources, a retroreflected signal of the waveform based at least in part on monitoring for the waveform.

Aspect 2: The method of aspect 1, further comprising: modulating the waveform with information based at least in part on monitoring the first subset of the set of resources, wherein the retroreflected signal of the waveform includes the information based at least in part on modulating the waveform with the information.

Aspect 3: The method of aspect 2, wherein the information comprises an ID of the first wireless device, waveform information, service capabilities of the first wireless device, or both.

Aspect 4: The method of any of aspects 1 through 3, further comprising: receiving, from the second wireless device, a broadcast control signal based at least in part on transmitting the retroreflected signal of the waveform.

Aspect 5: The method of any of aspects 1 through 4, further comprising: receiving, via a set of sidelink resources, a sidelink control message indicating that the first wireless device is to be a relay in sidelink communications between the first wireless device and the second wireless device, wherein receiving the sidelink control message is based at least in part on transmitting the retroreflected signal of the waveform.

Aspect 6: The method of any of aspects 1 through 5, further comprising: transmitting a capability message indicating a capability of the first wireless device to support the retroreflection communications, wherein receiving the control signaling is based at least in part on the capability of the first wireless device.

Aspect 7: The method of aspect 6, wherein the capability message further indicates supported modulation schemes for the retroreflection communications, supported frequency bands for the retroreflection communications, latency metrics associated with the retroreflection communications, a transmission gain associated with the retroreflection communications, or a combination thereof.

Aspect 8: The method of any of aspects 6 through 7, wherein the capability message further indicates whether the first wireless device supports active retroreflection communications between, a power capability associated with the active retroreflection communications, or both.

Aspect 9: The method of any of aspects 6 through 8, wherein the capability message further indicates whether the first wireless device supports concurrent retroreflection communications and actively powered communications between the first wireless device and the second wireless device or a third wireless device.

Aspect 10: The method of any of aspects 1 through 9, further comprising: receiving, via the control signaling, an indication of an antenna array to use for the retroreflection communications, wherein the retroreflected signal of the waveform is transmitted via the antenna array.

Aspect 11: The method of any of aspects 1 through 10, wherein activation of the retroreflection communications is based at least in part on a cell associated with the second wireless device, a channel raster associated with a channel between the first wireless device and the second wireless device, or both.

Aspect 12: The method of any of aspects 1 through 11, wherein the first subset of the set of resources is associated with a first frequency band and the second subset of the set of resources is associated with a second frequency band different from the first frequency band.

Aspect 13: The method of any of aspects 1 through 12, wherein the first subset of the set of resources and the second subset of the set of resources are associated with a same frequency band.

Aspect 14: The method of any of aspects 1 through 13, wherein the first wireless device is operating in a connected mode of operation, and the control signaling is received via a RRC message, a MAC-CE, DCI, or a combination thereof.

Aspect 15: The method of any of aspects 1 through 14, wherein the first wireless device is operating in one or both of an idle mode of operation or an inactive mode of operation, and the control signaling is received via a SI transmission.

Aspect 16: A method for wireless communications, comprising: transmitting control signaling that indicates a set of resources during which a first wireless device activates retroreflection communications between the first wireless device and a second wireless device; transmit, via a first subset of the set of resources, a waveform in accordance with the control signaling; and receiving, via a second subset of the set of resources, a retroreflected signal of the waveform based at least in part on transmitting the waveform.

Aspect 17: The method of aspect 16, further comprising: measuring positioning information associated with the first wireless device based at least in part on receiving the retroreflected signal of the waveform; and transmitting the positioning information associated with the first wireless device to a third wireless device based at least in part on measuring the positioning information.

Aspect 18: The method of aspect 17, further comprising: transmitting a broadcast control signal in a direction of the first wireless device, the direction being based at least in part on the positioning information.

Aspect 19: The method of any of aspects 17 through 18, further comprising: transmitting, via a set of sidelink resources, a sidelink control message indicating that the first wireless device is to be a relay in sidelink communications, wherein transmitting the sidelink control message is based at least in part on receiving the retroreflected signal of the waveform and the positioning information.

Aspect 20: The method of any of aspects 17 through 19, wherein the positioning information comprises an angle between the first wireless device and the second wireless device, a delay associated with communications between the first wireless device and the second wireless device, doppler information associated with the communications between the first wireless device and the second wireless device, or a combination thereof.

Aspect 21: The method of any of aspects 16 through 20, further comprising: receiving, from a third wireless device, a message indicating the set of resources for the retroreflection communications, the message further indicating a set of transmission parameters for transmission of the waveform from the second wireless device to the first wireless device, wherein transmitting the control signaling is in accordance with receiving the set of resources, and wherein transmitting the waveform is in accordance with the set of transmission parameters.

Aspect 22: The method of aspect 21, wherein the set of transmission parameters comprise a waveform configuration, a transmission power of the waveform, an ID associated with the first wireless device, or a combination thereof.

Aspect 23: The method of any of aspects 16 through 22, further comprising: receiving a capability message indicating a capability of the first wireless device to support the retroreflection communications, wherein transmitting the control signaling is based at least in part on the capability of the first wireless device.

Aspect 24: The method of any of aspects 16 through 23, further comprising: transmitting, via the control signaling, an indication of an antenna array to use for the retroreflection communications.

Aspect 25: The method of any of aspects 16 through 24, wherein the retroreflected signal of the waveform comprises information from the first wireless device, the information comprising an ID of the first wireless device, waveform information, service capabilities of the first wireless device, or a combination thereof.

Aspect 26: A method for wireless communications comprising: identifying a first wireless device and a second wireless device that support retroreflection communications; and transmitting, to the second wireless device and based on identifying of the second wireless device, a message indicating a set of resources for the retroreflection communications with the first wireless device.

Aspect 27: The method of aspect 26, further comprising: transmitting, via the message, an indication of a set of transmission parameters for transmission of a waveform from the second wireless device to the first wireless device.

Aspect 28: The method of aspect 27, wherein the set of transmission parameters comprise a waveform configuration, a transmission power of the waveform, an ID associated with the first wireless device, or a combination thereof.

Aspect 29: The method of aspect 26, further comprising: receiving, from the second wireless device, an indication of positioning information associated with the first wireless device, wherein the positioning information comprises an angle between the first wireless device and the second wireless device, a delay associated with communications between the first wireless device and the second wireless device, doppler information associated with the communications between the first wireless device and the second wireless device, or a combination thereof.

Aspect 30: The method of aspect 29, further comprising: transmitting, to the second wireless device, a message indicating of a set of sidelink resources for sidelink communications between the first wireless device and the second wireless device based at least in part on receiving the positioning information.

Aspect 31: A first wireless device for wireless communication, comprising one or more memories storing processor-executable code and one or more processors coupled with the one or more memories and individually or collectively operable to execute the code to cause the first wireless device to perform a method of any of aspects 1 through 15.

Aspect 32: A first wireless device for wireless communication, comprising at least one means for performing a method of any of aspects 1 through 15.

Aspect 33: A non-transitory computer-readable medium storing code for wireless communications, the code comprising instructions executable by a processor to perform a method of any of aspects 1 through 15.

Aspect 34: An apparatus for wireless communications, comprising one or more memories storing processor-executable code and one or more processors coupled with the one or more memories and individually or collectively operable to execute the code to cause the apparatus to perform a method of any of aspects 16 through 25.

Aspect 35: An apparatus for wireless communications, comprising at least one means for performing a method of any of aspects 16 through 25.

Aspect 36: A non-transitory computer-readable medium storing code for wireless communications, the code comprising instructions executable by a processor to perform a method of any of aspects 16 through 25.

Aspect 37: An apparatus comprising at least one processor; one or more memories storing processor-executable code and one or more processors coupled with the one or more memories and individually or collectively operable to execute the code to cause the apparatus to perform a method of any of aspects 26 through 30.

Aspect 38: An apparatus comprising at least one means for performing a method of any of aspects 26 through 30.

Aspect 39: A non-transitory computer-readable medium storing code the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device for wireless communication, comprising:

one or more memories storing processor-executable code; and one or more processors coupled with the one or more memories and individually or collectively operable to execute the code to cause the first wireless device to:

receive control signaling that indicates a set of resources during which the first wireless device activates retroreflection communications between the first wireless device and a second wireless device;

monitor a first subset of the set of resources for a waveform in accordance with the control signaling;

transmit, via a second subset of the set of resources, a retroreflected signal of the waveform based at least in part on monitoring for the waveform; and receive, via a set of sidelink resources, a sidelink control message indicating that the first wireless device is to be a relay in sidelink communications between the first wireless device and the second wireless device, wherein receiving the sidelink control message is based at least in part on transmitting the retroreflected signal of the waveform.

2. The first wireless device of claim 1, wherein the one or more processors are individually or collectively further operable to execute the code to cause the first wireless device to:

modulate the waveform with information based at least in part on monitoring the first subset of the set of resources, wherein the retroreflected signal of the waveform includes the information based at least in part on modulating the waveform with the information.

3. The first wireless device of claim 2, wherein the information comprises an identifier of the first wireless device, waveform information, service requests of the first wireless device, or both.

4. The first wireless device of claim 1, wherein the one or more processors are individually or collectively further operable to execute the code to cause the first wireless device to:

receive, from the second wireless device, a broadcast control signal based at least in part on transmitting the retroreflected signal of the waveform.

5. The first wireless device of claim 1, wherein the one or more processors are individually or collectively further operable to execute the code to cause the first wireless device to:

transmit a capability message indicating a capability of the first wireless device to support the retroreflection communications, wherein receiving the control signaling is based at least in part on the capability of the first wireless device.

6. The first wireless device of claim 5, wherein the capability message further indicates supported modulation schemes for the retroreflection communications, supported frequency bands for the retroreflection communications, latency metrics associated with the retroreflection communications, a transmission gain associated with the retroreflection communications, or a combination thereof.

7. The first wireless device of claim 5, wherein the capability message further indicates whether the first wireless device supports active retroreflection communications between, a power capability associated with the active retroreflection communications, or both.

8. The first wireless device of claim 5, wherein the capability message further indicates whether the first wireless device supports concurrent retroreflection communications and actively powered communications between the first wireless device and the second wireless device or a third wireless device.

9. The first wireless device of claim 1, wherein the one or more processors are individually or collectively further operable to execute the code to cause the first wireless device to:

receive, via the control signaling, an indication of an antenna array to use for the retroreflection communications, wherein the retroreflected signal of the waveform is transmitted via the antenna array.

10. The first wireless device of claim 1, wherein activation of the retroreflection communications is based at least in part on a cell associated with the second wireless device, a channel raster associated with a channel between the first wireless device and the second wireless device, or both.

11. The first wireless device of claim 1, wherein the first subset of the set of resources is associated with a first frequency band and the second subset of the set of resources is associated with a second frequency band different from the first frequency band.

12. The first wireless device of claim 1, wherein the first subset of the set of resources and the second subset of the set of resources are associated with a same frequency band.

13. The first wireless device of claim 1, wherein the first wireless device is operating in a connected mode of operation, and the control signaling is received via a radio resource control message, a medium access control-control element, downlink control information, or a combination thereof.

14. The first wireless device of claim 1, wherein the first wireless device is operating in one or both of an idle mode of operation or an inactive mode of operation, and the control signaling is received via a system information transmission.

15. An apparatus for wireless communications, comprising:

one or more memories storing processor-executable code; and one or more processors coupled with the one or more memories and individually or collectively operable to execute the code to cause the apparatus to:

transmit control signaling that indicates a set of resources during which a first wireless device activates retroreflection communications between the first wireless device and the apparatus;

transmit, via a first subset of the set of resources, a waveform in accordance with the control signaling;

receive, via a second subset of the set of resources, a retroreflected signal of the waveform based at least in part on transmitting the waveform;

measure positioning information associated with the first wireless device based at least in part on receiving the retroreflected signal of the waveform;

transmit the positioning information associated with the first wireless device based at least in part on measuring the positioning information; and transmit, via a set of sidelink resources, a sidelink control message indicating that the first wireless device is to be a relay in sidelink communications. wherein transmitting the sidelink control message is based at least in part on receiving the retroreflected signal of the waveform and the positioning information.

16. The apparatus of claim 15, wherein the one or more processors are individually or collectively further operable to execute the code to cause the apparatus to:

transmit a broadcast control signal in a direction of the first wireless device, the direction being based at least in part on the positioning information.

17. The apparatus of claim 15, wherein the positioning information comprises an angle between the first wireless device and the apparatus, a delay associated with communications between the first wireless device and the apparatus, doppler information associated with the communications between the first wireless device and the apparatus, or a combination thereof.

18. The apparatus of claim 15, wherein the one or more processors are individually or collectively further operable to execute the code to cause the apparatus to:

receive a message indicating the set of resources for the retroreflection communications, the message further indicating a set of transmission parameters for transmission of the waveform from the apparatus to the first wireless device, wherein transmitting the control signaling is in accordance with receiving the set of resources, and wherein transmitting the waveform is in accordance with the set of transmission parameters.

19. The apparatus of claim 18, wherein the set of transmission parameters comprise a waveform configuration, a transmission power of the waveform, an identifier associated with the first wireless device, or a combination thereof.

20. The apparatus of claim 15, wherein the one or more processors are individually or collectively further operable to execute the code to cause the apparatus to:

receive a capability message indicating a capability of the first wireless device to support the retroreflection communications, wherein transmitting the control signaling is based at least in part on the capability of the first wireless device.

21. The apparatus of claim 15, wherein the one or more processors are individually or collectively further operable to execute the code to cause the apparatus to:

transmit, via the control signaling, an indication of an antenna array to use for the retroreflection communications.

22. The apparatus of claim 15, wherein the retroreflected signal of the waveform comprises information from the first wireless device, the information comprising an identifier of the first wireless device, waveform information, service requests of the first wireless device, or a combination thereof.

23. A method for wireless communications at a first wireless device, comprising:

receiving control signaling that indicates a set of resources during which the first wireless device activates retroreflection communications between the first wireless device and a second wireless device;

monitoring a first subset of the set of resources for a waveform in accordance with the control signaling;

transmitting, via a second subset of the set of resources, a retroreflected signal of the waveform based at least in part on monitoring for the waveform; and receiving, via a set of sidelink resources, a sidelink control message indicating that the first wireless device is to be a relay in sidelink communications between the first wireless device and the second wireless device, wherein receiving the sidelink control message is based at least in part on transmitting the retroreflected signal of the waveform.

* * * * *